US007405493B2

(12) United States Patent
Leo

(10) Patent No.: US 7,405,493 B2
(45) Date of Patent: Jul. 29, 2008

(54) DOUBLE POLE LED OUTLET SWITCH

(76) Inventor: Robert J. Leo, 706 20th Ave. West, Brandenton, FL (US) 34205

( * ) Notice: Subject to any disclaimer, the term of this patent is extended or adjusted under 35 U.S.C. 154(b) by 0 days.

(21) Appl. No.: 11/559,279

(22) Filed: Nov. 13, 2006

(65) Prior Publication Data

US 2007/0127238 A1 Jun. 7, 2007

Related U.S. Application Data

(63) Continuation of application No. 10/844,430, filed on May 13, 2004.

(51) Int. Cl.
*H02J 1/00* (2006.01)

(52) U.S. Cl. .......................................................... 307/38

(58) Field of Classification Search ................... 307/38, 307/113, 115

See application file for complete search history.

(56) References Cited

U.S. PATENT DOCUMENTS

| | | | | |
|---|---|---|---|---|
| 3,496,379 | A | 2/1970 | Platzer, Jr. | |
| 3,872,319 | A | 3/1975 | Platzer, Jr. | |
| 3,928,737 | A | 12/1975 | Prasert | |
| 4,292,546 | A | 9/1981 | Clark | |
| 4,383,186 | A | 5/1983 | Liang | |
| 4,395,640 | A | 7/1983 | Bone | |
| 4,578,593 | A | 3/1986 | Davidov | |
| 4,736,114 | A | 4/1988 | Reichl | |
| 4,755,691 | A | 7/1988 | Bethea | |
| 5,036,214 | A | 7/1991 | Zerillo | |
| 5,574,319 | A | 11/1996 | Bennett | |
| 5,598,039 | A | 1/1997 | Weber | |
| 5,874,789 | A | 2/1999 | Su | |
| 5,895,985 | A | 4/1999 | Fischer | |
| 5,955,791 | A * | 9/1999 | Irlander | 307/38 |
| 6,097,111 | A | 8/2000 | Anrod | |
| 6,160,728 | A | 12/2000 | Peterson et al. | |
| 6,165,010 | A * | 12/2000 | Prazoff | 439/534 |
| 6,710,553 | B2 | 3/2004 | Logan | |
| 2001/0030470 | A1 | 10/2001 | Waugh et al. | |

FOREIGN PATENT DOCUMENTS

| | | |
|---|---|---|
| EP | 0520221 | 12/1992 |
| GB | 2182214 | 5/1987 |

* cited by examiner

*Primary Examiner*—Robert L. Deberadinis
(74) *Attorney, Agent, or Firm*—Wood, Herron & Evans, LLP

(57) ABSTRACT

A double pole LED outlet switch includes a power outlet receptacle with upper and lower receptacles, and a double pole double throw (DPDT) switch. The DPDT switch is positionable between an UNSWITCHED position and a SWITCHED position. The DPDT switch enables a user to provide either continuous power or switched power to at least the lower receptacle outlet double pole LED outlet switch. The double pole LED outlet switch may be configured as either an independent or a dual double pole LED outlet switch. Both the independent and dual outlet double pole LED outlet switches are most efficiently utilized if installed during construction. A post construction double pole LED outlet switch receptacle may be realized in two types of configurations. One configuration is a master unit and one configuration is a slave unit.

23 Claims, 15 Drawing Sheets

DOUBLE POLE LED OUTLET SWITCH

The present application is a continuation of U.S. patent application Ser. No. 10/844,430, filed May 13, 2004, disclosure of which is hereby incorporated herein by reference in its entirety.

BACKGROUND OF THE INVENTION

1. Field of the Invention

The present invention generally relates to power outlet receptacles and, more particularly, to a double pole light emitting diode (LED) outlet switch for providing flexible control of power outlet receptacles.

2. Description of the Related Art

Switched duplex power receptacles have been in use for years. Typically, a switched duplex power outlet receptacle is a standard duplex outlet receptacle with the upper and lower outlets isolated by physically breaking the tab between the upper and lower outlets on the power or ungrounded conductor terminal of the receptacle.

The main problem with conventional duplex power outlet receptacles is their lack of flexibility. After initial installation of a duplex power outlet receptacle, the function of the receptacle becomes fixed and rigid. Another problem with conventional duplex power outlet receptacles is that a duplex power outlet receptacle configured for control by a remote wall switch is permanently dedicated to function in a fixed single location. Another problem with conventional duplex power outlet receptacles is, when a duplex power outlet receptacle is switched, its dedicated function and location is often under or poorly utilized because the position of the receptacle is often not in a convenient or functional location. This problem is most aptly demonstrated when the remote wall switch inadvertently removes the power from an appliance not intended to be turned off (e.g., a computer, television, phone charger, light, etc., cannot be positioned where it is desired).

While these devices may be suitable for the particular purpose to which they address, they are not suitable for providing flexible control of switched duplex power outlet receptacles. Therefore, a need exists for a double pole LED outlet switch that provides flexible control of switched duplex power outlet receptacles.

The related art is represented by the following references of interest.

U.S. Pat. Application Publication No. 2001/0030470 A1, published on Oct. 18, 2001 for William H. Waugh et al., describes an appliance switching system that is used in combination with a duplex electric outlet having a first receptacle that is constantly energized and a second receptacle that is selectively energized and de-energized by operation of a wall switch. The Waugh et at. application does not suggest a double pole LED outlet switch according to the claimed invention.

U.S. Pat. No. 6,710,553 published on Dec. 5, 2002 for James D. Logan, describes a control circuit for operating a lamp or other electrically operated device using a conventional wall socket outlet that is selectively energized under the control of a conventional wall mounted switch. The Logan patent does not suggest a double pole LED outlet switch according to the claimed invention.

U.S. Pat. No. 3,496,379, issued on Feb. 17, 1970 for George E. Platzer, Jr., describes electrical circuitry that enables the energization and de-energization of a remotely situated electrical load from a point that is remote from the electrical load as well as from a switch device carried by the load or in close proximity thereto. The Platzer, Jr. '379 patent does not suggest a double pole LED outlet switch according to the claimed invention.

U.S. Pat. No. 3,872,319, issued on Mar. 18, 1975 for George E. Platzer, Jr., describes a circuitry and apparatus for the independent control of a lamp from either a wall switch or a switch at or near the lamp, regardless of the phase of the wall outlets used. The Platzer, Jr. '319 patent does not suggest a double pole LED outlet switch according to the claimed invention.

U.S. Pat. No. 3,928, 737, issued on Dec. 23, 1975 for Lopsadhayoodh Prasert, describes a remote control switching device for the remote control of lighting or power circuits. The Present patent does not suggest a double pole LED outlet switch according to the claimed invention.

U.S. Pat. No. 4,292,546, issued on Sep. 29, 1981 for Warren P. Clark, describes a power control apparatus for applying or removing power to an electrical appliance that is remote with respect to the user. The Clark patent does not suggest a double pole LED outlet switch according to the claimed invention.

U.S. Pat. No. 4,383,186, issued on May 10, 1983 for Christopher Liang, describes an electrical switching apparatus that can be easily connected to and disconnected from existing sockets in conventional electrical wiring of a building. The Liang patent does not suggest a double pole LED outlet switch according to the claimed invention.

U.S. Pat. No. 4,395,640, issued on Jul. 26, 1983 for Keith A. Bone, describes an electricity distribution unit that has a plurality of electrical outlets integrated into an adjustably sized unitary assembly having means for switchably energizing selected ones of the outlets. The Bone patent does not suggest a double pole LED outlet switch according to the claimed invention.

U.S. Pat. No. 4,578,593, issued on Mar. 25, 1986 for Mircho A. Davidov, describes an electrical control module that provides both remote and wall operated switching for an electrical device. The Davidov patent does not suggest a double pole LED outlet switch according to the claimed invention.

U.S. Pat. No. 4,736,114, issued on Apr. 5, 1988 for Erwin Reichl, describes an electrical switching system and a method for switching the system. The Reichl patent does not suggest a double pole LED outlet switch according to the claimed invention.

U.S. Pat. No. 4,755,691, issued on Jul. 5, 1988 for Duke O. Bethea, describes a portable, modular small appliance control system for lamps and the like, which allows separate control of each outlet of a multiple outlet receptacle from separate and remote locations. The Bethea patent does not suggest a double pole LED outlet switch according to the claimed invention.

U.S. Pat. No. 5,036,214, issued on Jul. 30, 1991 for Michael A. Zerillo, describes a remote control mechanism for controlling electricity from a non-interruptible electric supply, and for optionally and simultaneously controlling electricity from a second, but interruptible electric supply like that provided by a clock-actuated switch in series with a continuous electric supply. The Zerillo patent does not suggest a double pole LED outlet switch according to the claimed invention.

U.S. Pat. No. 5,574,319, issued on Nov. 12, 1996 for Neil W. Bennett, describes plug-in electrical devices which allow a load device to be electrically connected to and disconnected from an electrical power source at either (a) a switched outlet electrically coupled between the power source and the load, and (b) a location in the vicinity of the load. The Bennett patent does not suggest a double pole LED outlet switch according to the claimed invention.

U.S. Pat. No. 5,598,039, issued on Jan. 28, 1997 for Harold J. Weber, describes a method and apparatus for sensing a state of electric power flow through a master circuit and producing remote control of a slave circuit. The Weber patent does not suggest a double pole LED outlet switch according to the claimed invention.

U.S. Pat. No. 5,874,789, issued on Feb. 23, 1999 for Chih-Hai Su, describes a circuit for integrating a local switch and a remote-control switch. The Su patent does not suggest a double pole LED outlet switch according to the claimed invention.

U.S. Pat. No. 5,895,985, issued on Apr. 20, 1999 for George Fischer, describes a remote switching system for extending the function of an existing wired switch in a residence or other building, so that, in its extended function, the switch controls AC power available at one or more additional AC outlets. The Fischer patent does not suggest a double pole LED outlet switch according to the claimed invention.

U.S. Pat. No. 6,097,111, issued on Aug. 11, 2000 for Stephen C. Anrod, describes a mode selectable power receptacle. The Anrod patent does not suggest a double pole LED outlet switch according to the claimed invention.

U.S. Pat. No. 6,160,728, issued on Dec. 12, 2000 for Joe W. Peterson et at., describes an electrical receptacle that provides power through two separate sockets. The Peterson et al. patent does not suggest a double pole LED outlet switch according to the claimed invention.

Great Britain Patent Application Publication No. 2 188 214 A, published on May 7, 1987, describes an electrical load control system. The Great Britain '214 application does not suggest a double pole LED outlet switch according to the claimed invention.

European Patent Application Publication No. 0 520 221 A1, published on Dec. 30, 1992, describes an electronically switched power receptacle. The European '221 application does not suggest a double pole LED outlet switch according to the claimed invention.

None of the above references, taken either singly or in combination, is seen to describe the instant invention as claimed. Thus a double pole LED outlet switch solving the aforementioned problems is desired.

SUMMARY OF THE INVENTION

The present invention is a double pole LED outlet switch. The double pole LED outlet switch includes a power outlet receptacle with an upper receptacle outlet and a lower receptacle outlet, and a double pole double throw (DPDT) switch. The DPDT switch is positionable between an UNSWITCHED position and a SWITCHED position. The DPDT switch enables a user to provide either continuous power or switched power to at least the lower receptacle outlet double pole LED outlet switch.

The double pole LED outlet switch may be configured as either an independent or a dual double pole LED outlet switch. Both the independent and dual double pole LED outlet switches are most efficiently utilized if installed during construction. A post construction double pole LED outlet switch receptacle may be realized in two types of configurations. One configuration type is a master unit, and one configuration type is a slave unit.

Accordingly it is a principal aspect to provide a double pole LED outlet switch with a power outlet receptacle including upper and lower receptacle outlets, and a DPDT switch. The DPDT switch is positionable between an UNSWITCHED position and a SWITCHED position. The DPDT switch enables a user to provide either continuous power or switched power to at least the lower receptacle outlet double pole LED outlet switch.

It is another aspect of the invention to provide a double pole LED outlet switch with a power outlet receptacle including upper and lower receptacle outlets, a DPDT switch, and LED circuitry. The DPDT switch is positionable between an UNSWITCHED position and a SWITCHED position. The LED circuitry includes at least one LED to provide a visual indication as to whether any receptacle outlet in the double pole LED outlet switch provides switched power. The DPDT switch enables a user to provide either continuous power or switched power to at least the lower receptacle outlet double pole LED outlet switch.

It is an aspect of the invention to provide improved elements and arrangements thereof in a double pole LED outlet switch for the purposes described that is inexpensive, dependable, and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
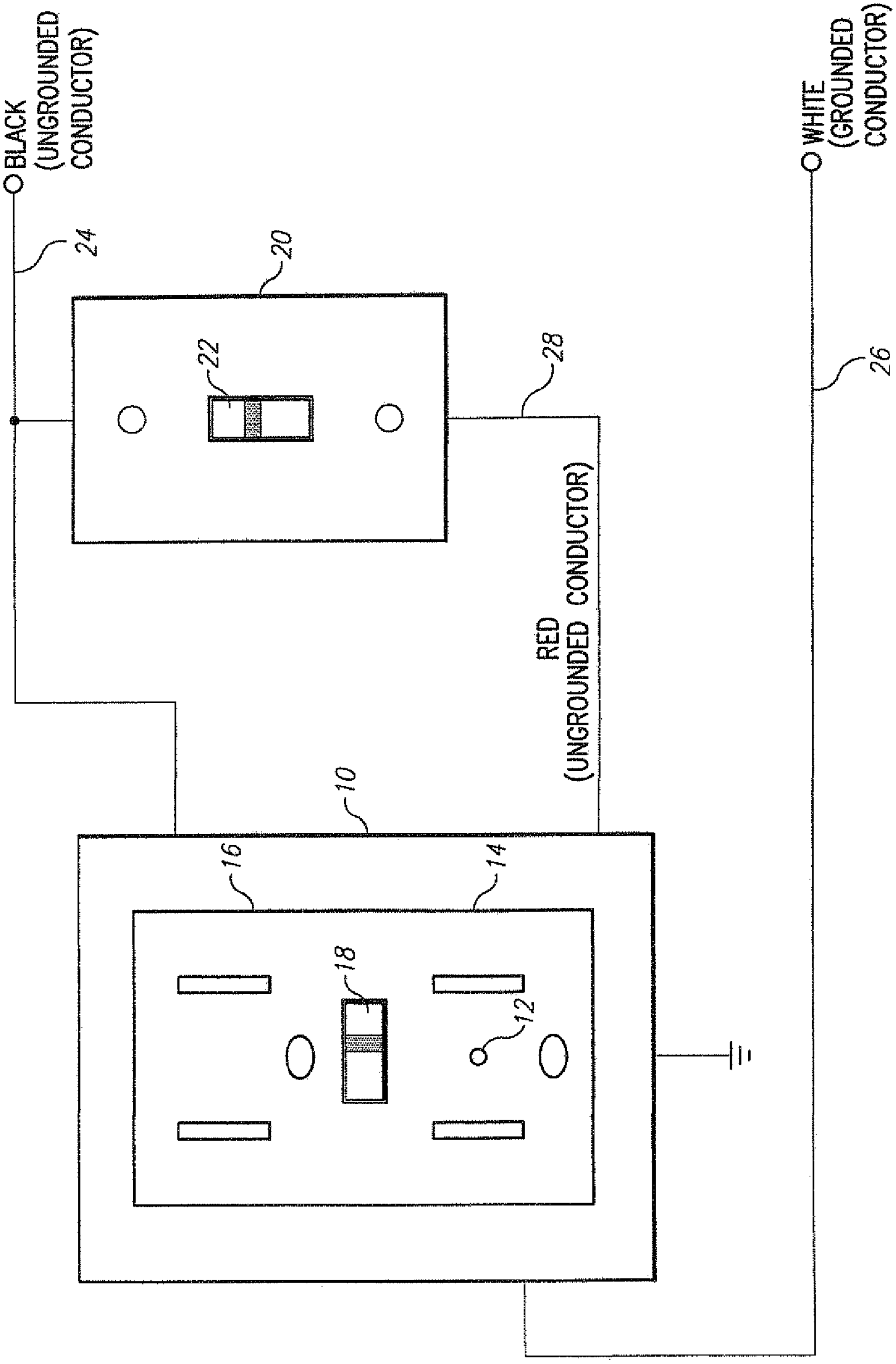
FIG. 1 is a double pole LED outlet switch according to the present invention.

The present invention is a double pole LED outlet switch. The invention disclosed herein is, of course, susceptible to embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Referring to the drawings, FIG. 1 shows a double pole LED outlet switch 10 according to the invention. The double pole LED outlet switch 10 allows for flexible use of a standard switched power receptacle system. The outlet switch 10 has a physical appearance of a standard 120 VAC power duplex outlet receptacle with some differences.

The outlet switch 10 includes a lower receptacle 14 and an upper receptacle 16. A small LED 12 associated with the lower receptacle 14 is inset between the power and the grounded conductor blade insertion points of the lower receptacle outlet 14. A double pole double throw (DPDT) switch 18 is inset between the lower receptacle 14 and the upper receptacle 16.

The DPDT switch 18 has two positions for either normal operation or wall SWITCHED operation of the lower receptacle outlet 14 via an interconnected wall switch panel 20. The wall switch panel 20 includes a wall switch 22. The outlet switch 10 is electrically interconnected with respective black (ungrounded conductor), white (grounded conductor), and red (switched ungrounded conductor) wiring 24, 26, and 28. When the DPDT switch 18 is set in the SWITCHED position, wall switch controlled operation of the lower receptacle 14 is indicated by the LED 12 situated between the power and common blade within the lower receptacle 14. A double pole LED outlet switch according to the invention may be configured as either an independent or dual double pole LED outlet switches. Both the independent and dual double pole LED outlet switches are most efficiently utilized if installed during construction. A post construction double pole LED outlet switch receptacle may be realized in two types of configurations. One configuration is a master unit, and one configuration is a slave unit.

Figure 2:
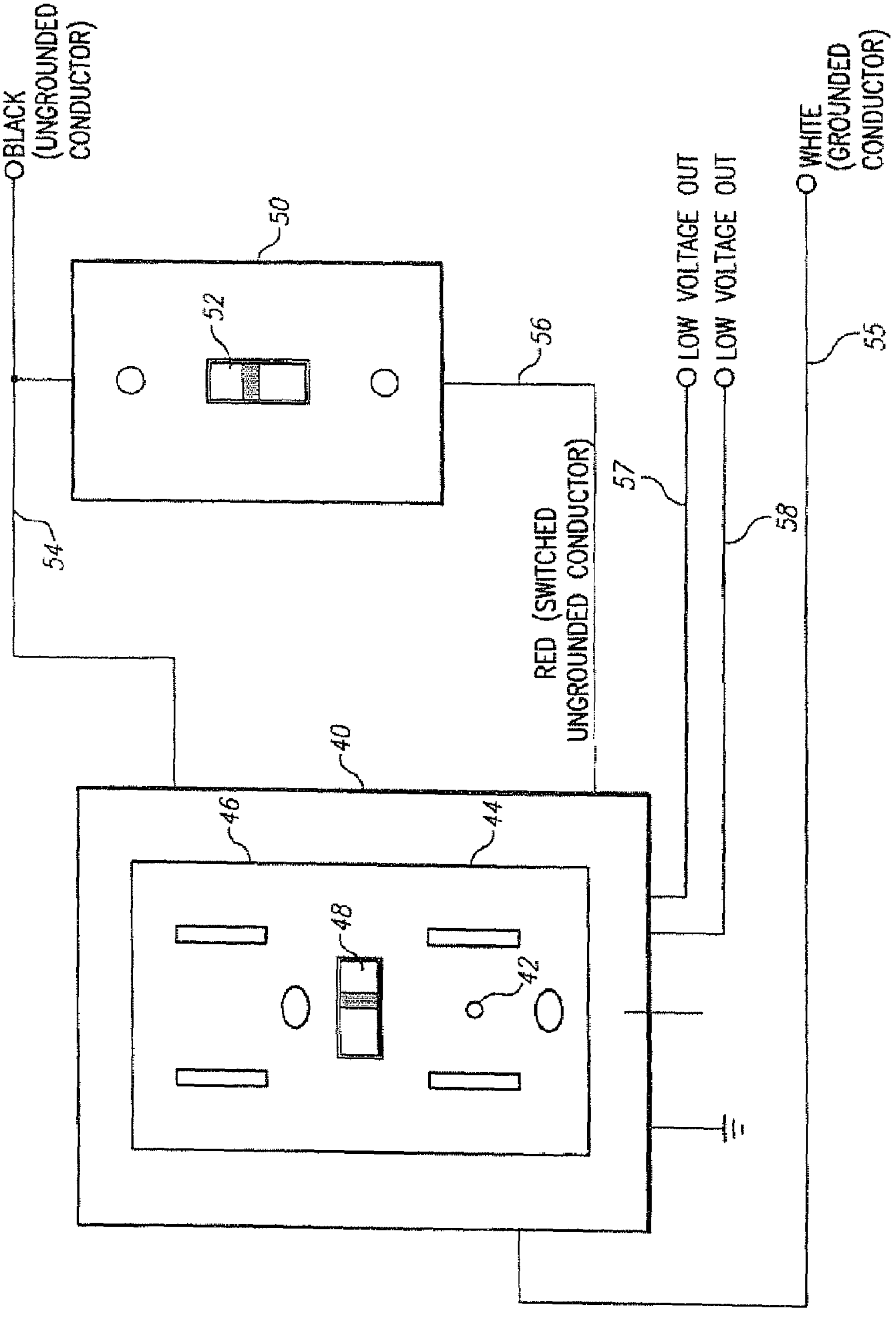
FIG. 2 is a post construction double pole LED outlet switch configured as a master unit according to the present invention.

A post construction double pole LED outlet switch 40 shown in FIG. 2 is configured as a master unit. The master unit according to the invention is configured to replace an existing switched outlet in a room so that additional switched outlets may be placed therein according to the desires of the user. The outlet switch 40 includes an LED 42 associated with the lower receptacle 44. The outlet switch 40 also includes all upper receptacle 46 and a DPDT switch 48, as well as two low voltage wires 57 and 58 extending out of the bottom of the cover plate of the outlet switch 40. The DPDT switch 48 has two positions for either normal operation or wall switched operation of the lower receptacle 44 via an interconnected wall switch 52. The wall switch 52 is mounted on a wall switch panel 50. The outlet switch 40 is electrically interconnected with respective black (ungrounded conductor), white (grounded conductor), and red (switched ungrounded conductor) wiring 54, 55, and 56. When the DPDT switch 48 is set in the SWITCHED position, wall switch controlled operation of the lower receptacle 44 is indicated by the LED 42 situated between the power and common blade within the lower receptacle 44.

The low voltage wires 57 and 58 extending out of the bottom of the cover plate of the outlet switch 40 are configured to connect to slave units via the baseboard. A step down transformer with a bridge rectifier built into the outlet switch 40 provides low voltage (about twelve to twenty-eight volts DC) controlled by the wall switch 52. The low voltage is used to switch a solenoid in the slave units.

Slave units according to the invention are configured to replace existing UNSWITCHED receptacles in the same room as the master unit. The slave unit looks and functions the same as a normal independent double pole LED outlet switch receptacle, and also includes two wires going into the bottom of the cover plate of the slave unit. Inside the slave units a solenoid is used to switch the high voltage on via the wall switch.

Figure 3:
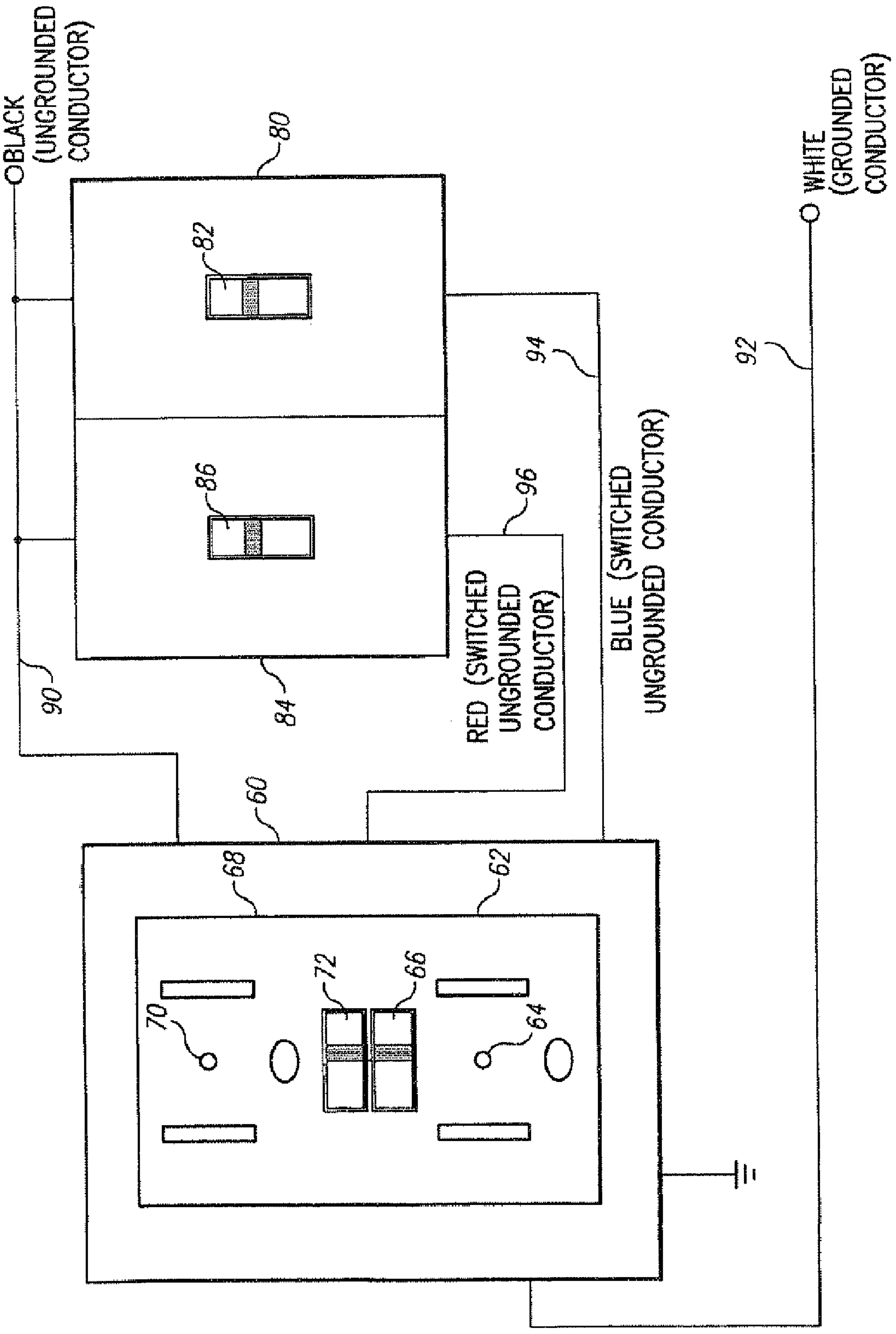
FIG. 3 is a dual double pole LED outlet switch according to the present invention.

A dual double pole LED outlet switch 60 is shown. in FIG. 3. The outlet switch 60 includes a lower receptacle 62 with an associated LED 64 and an associated DPDT switch 66. The outlet switch 60 also includes an upper receptacle 68 with an associated LED 80 and an associated DPDT switch 72. The two DPDT switches 66 and 72 allow the outlet switch 60 to function as two separate (top and bottom) wall switched power outlets, while still allowing a standard UNSWITCHED option for either or both outlets 62 and 68. The two LEDs 64 and 70 may be configured to illuminate different colors, such as red, blue, green, yellow, etc., in order to increase user flexibility to its greatest extent while minimizing confusion. Two separate wall switch panels can control two or more possible lighting schemes, or the power for two separate electrical devices. By placing two dual outlet switches next to each other, eight combinations of lighting can be controlled by four standard wall switches. This will satisfy even the most difficult customer.

Unlilke the single outlet double pole LED outlet switch previously described, the dual outlet double pole LED outlet switch 60 requires additional wires to each receptacle. Current requirements with this particular outlet switch 70 may be greater than the normal fifteen amp circuit.

Builders and light designers will find each configuration of the double pole LED outlet switch exceptionally attractive because they are a simple way to provide brilliant lighting and power control schemes for new or existing homes, office suites, apartments, hotel rooms, etc., at minimal expense. Providing this type of lighting solutions with present appliances is inconvenient and cost prohibitive, because moving a SWITCHED receptacle requires massive electrical remodeling that involves wall demolition and reconstruction.

Figure 4:
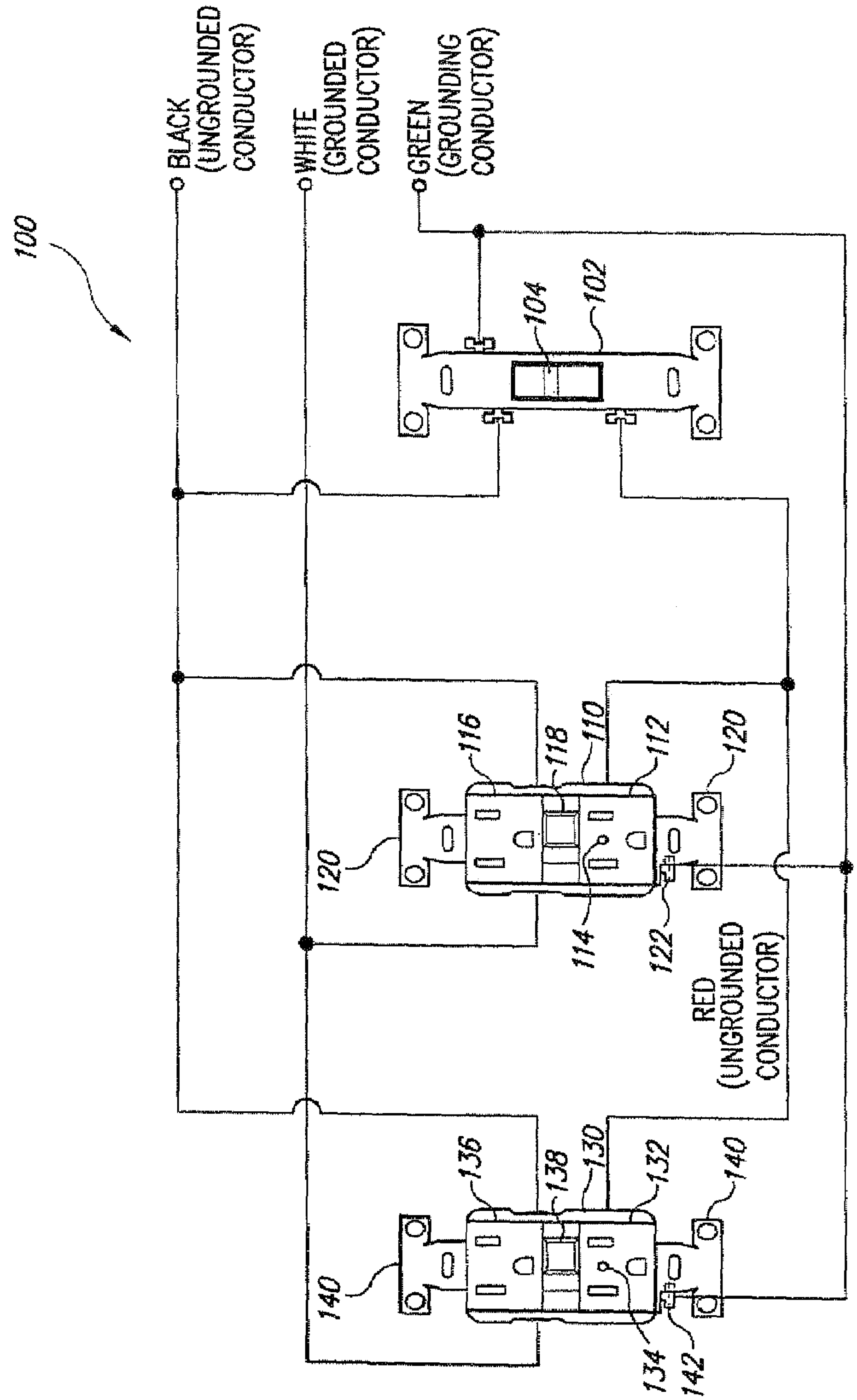
FIG. 4 is an electrical schematic for wiring two double pole LED outlet switches interconnected with each other and a single wall switch according to the present invention.

An electrical schematic for wiring a configuration 100 is shown in FIG. 4 where two double pole LED outlet switches 110 and 130 are interconnected with each other and a single wall switch 104. While two double pole LED outlet switches are shown in FIG. 4, any number of double pole LED outlet switches may be interconnected with each other and the single wall switch 104. The outlet switch 110 includes an LED 114 associated with a lower receptacle 112. The outlet switch 110 also includes an upper receptacle 116 and a DPDT switch 118. The outlet switch 110 is mounted on an outlet switch panel 120. The DPDT switch 118 has two positions for either normal operation or wall SWITCHED operation of the lower receptacle 112 via the interconnected wall switch 104. The interconnected wall switch 104 is mounted on a wall switch panel 102. The outlet switch 110 is electrically interconnected with respective black (ungrounded conductor), white (grounded conductor), and green (ground) wiring.

When the DPDT switch 118 is set in the SWITCHED position, wall switch controlled operation of the lower receptacle 112 is indicated by the LED 114 situated between the power and common blade within the lower receptacle 112.

The outlet switch 130 includes an LED 134 associated with a lower receptacle 132. The outlet switch 130 also includes an upper receptacle 136 and a DPDT switch 138. The DPDT switch 138 has two positions for either normal operation or wall SWITCHED operation of the lower receptacle 132 via the interconnected wall switch 104. The outlet switch 130 is electrically interconnected with respective black (ungrounded conductor), white (grounded conductor), and green (grounding conductor) wiring. When the DPDT switch 138 is set in the SWITCHED position, wall switch controlled operation of the lower receptacle 132 is indicated by the LED 134 situated between the power and common blade within the lower receptacle 132.

Figure 5:
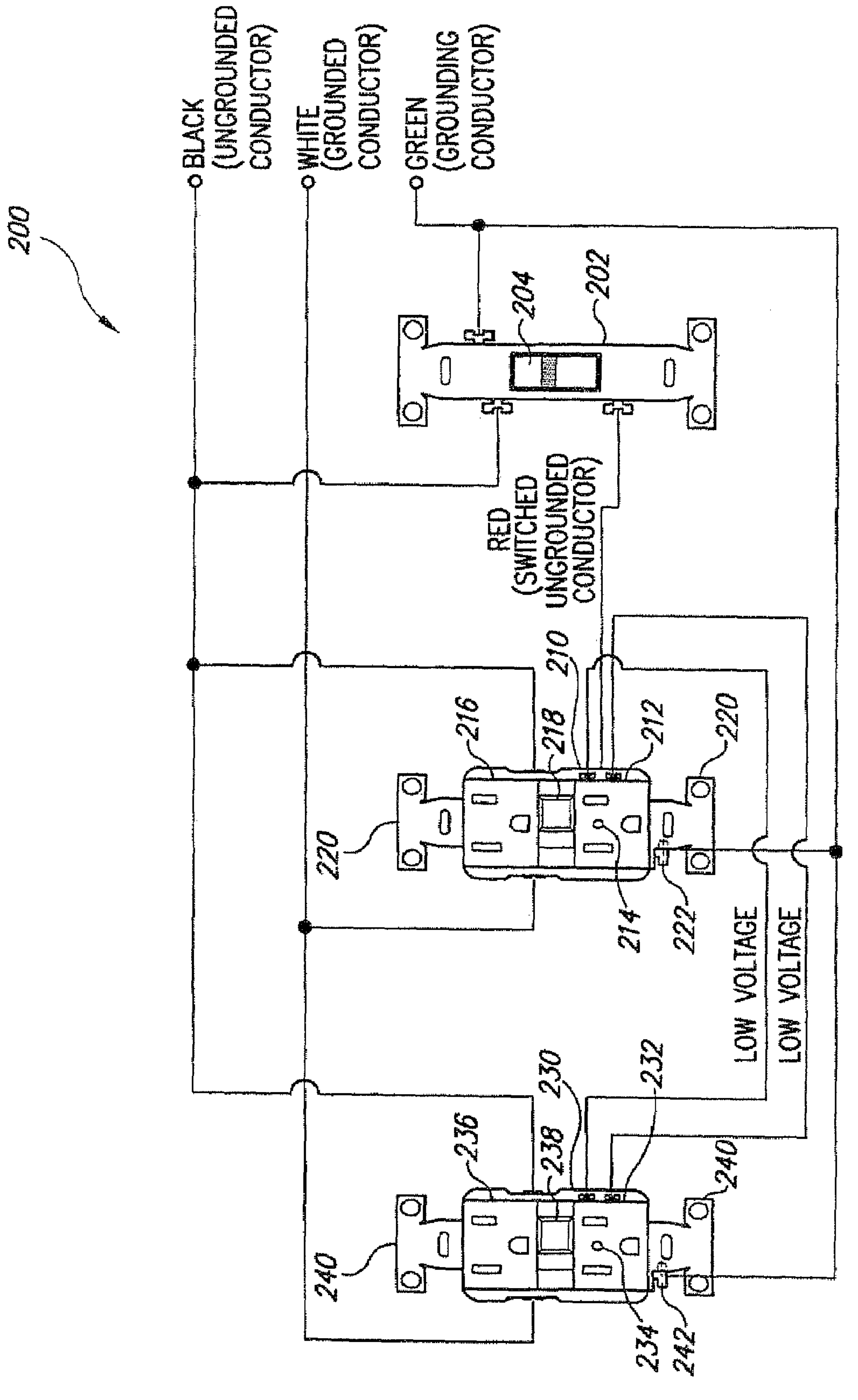
FIG. 5 is an electrical schematic for wiring post construction two double pole LED outlet switches interconnected with each other and a single wall switch according to the present invention.

An electrical schematic for wiring a configuration 200 is shown in FIG. 5 where two post construction double pole LED outlet switches 210 and 230 are interconnected with each other and a single wall switch 204 in a post construction variation The outlet switch 210 includes an LED 214 associated with a lower receptacle 212. The outlet switch 210 also includes an upper receptacle 216 and a DPDT switch 218. The outlet switch 210 is mounted on an outlet switch panel 220. The DPDT switch 218 has two positions for either normal operation or wall SWITCHED operation of the lower receptacle 214 via the interconnected wall switch 204. The wall switch 204 is mounted on a wall switch panel 202. The outlet switch 210 is electrically interconnected with respective black (ungrounded conductor), white (grounded conductor), and green (grounding conductor) wiring. When the DPDT switch 218 is set in the SWITCHED position, wall switch controlled operation of the lower receptacle 212 is indicated by the LED 214 situated between the power and common blade within the lower receptacle 212.

The outlet switch 230 includes an LED 234 associated with a lower receptacle 232. The outlet switch 230 also includes an upper receptacle 236 and a DPDT switch 238. The DPDT switch 238 has two positions for either normal operation or wall SWITCHED operation of the lower receptacle 232 via the interconnected wall switch 204. The outlet switch 230 is electrically interconnected with respective black (ungrounded conductor), white (grounded conductor), and green (grounding conductor) wiring. The outlet switch 230 is mounted on a wall switch panel 240. When the DPDT switch 238 is set in the SWITCHED position, wall switch controlled operation of the lower receptacle 232 is indicated by the LED 234 situated between the power and common blade within the lower receptacle 232.

Figure 6:
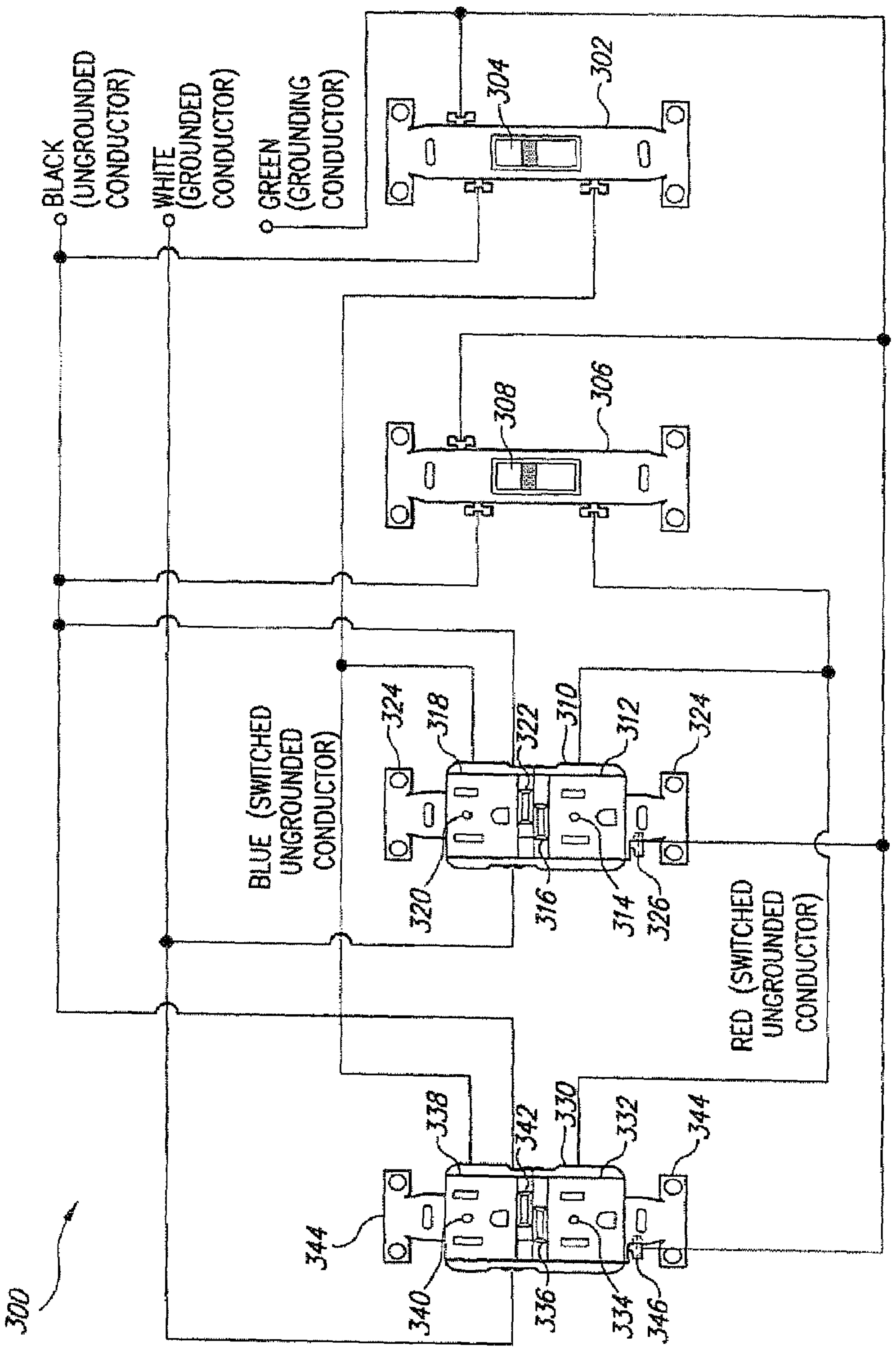
FIG. 6 is an electrical schematic for wiring two dual double pole LED outlet switches interconnected with each other and two wall switches according to the present invention.

An electrical schematic for wiring a configuration 300 is shown in FIG. 6 where two dual double pole LED outlet switches 310 and 330 are interconnected between each other and two wall switches 304 and 308. The dual outlet switch 310 includes a lower receptacle 312 with an associated LED 314 and an associated DPDT switch 316. The outlet switch 310 also includes an upper receptacle 318 with all associated LED 320 and an associated DPDT switch 322. The two DPDT switches 316 and 322 allow the outlet switch 310 to function as two separate (top and bottom) wall SWITCHED power outlets, while still allowing a standard UNSWITCHED option for either or both outlets 312 and 318. The two LEDs 314 and 320 may be configured to illuminate different colors, such as red, blue, green, yellow, etc., in order to increase user flexibility to its greatest extent while minimizing confusion. The outlet switch 310 is interconnected to wall switches 304 and 308 via black (ungrounded conductor), white (grounded conductor), green (grounding conductor), red (switched ungrounded conductor), and blue (switched ungrounded conductor) wiring. The outlet switch 310 is mounted on an outlet switch panel 324.

The dual outlet switch 330 includes a lower receptacle 332 with an associated LED 334 and an associated DPDT switch 336. The outlet switch 330 also includes an upper receptacle 338 with an associated LED 340 and an associated DPDT switch 342. The two DPDT switches 336 and 342 allow the outlet switch 330 to function as two separate (top and bottom) wall SWITCHED power outlets, while still allowing a standard UNSWITCHED option for either or both outlets 336 and 342. The two LEDs 334 and 340 may be configured to illuminate different colors, such as red, blue, green, yellow, etc., in order to increase user flexibility to its greatest extent while minimizing confusion. The outlet switch 330 is interconnected to wall switches 304 and 306 via black (ungrounded conductor), white (grounded conductor), green (grounding conductor), red (switched ungrounded conductor), and blue (switched ungrounded conductor) wiring. The outlet switch 330 is mounted on an outlet switch panel 344. The separate wall switches 304 and 308 can control two or more possible lighting schemes, or the power for two separate electrical devices. By placing the two dual outlet switches 310 and 330 next to each other, eight combinations of lighting can be controlled by the two wall switches 304 and 308.

Figure 7:
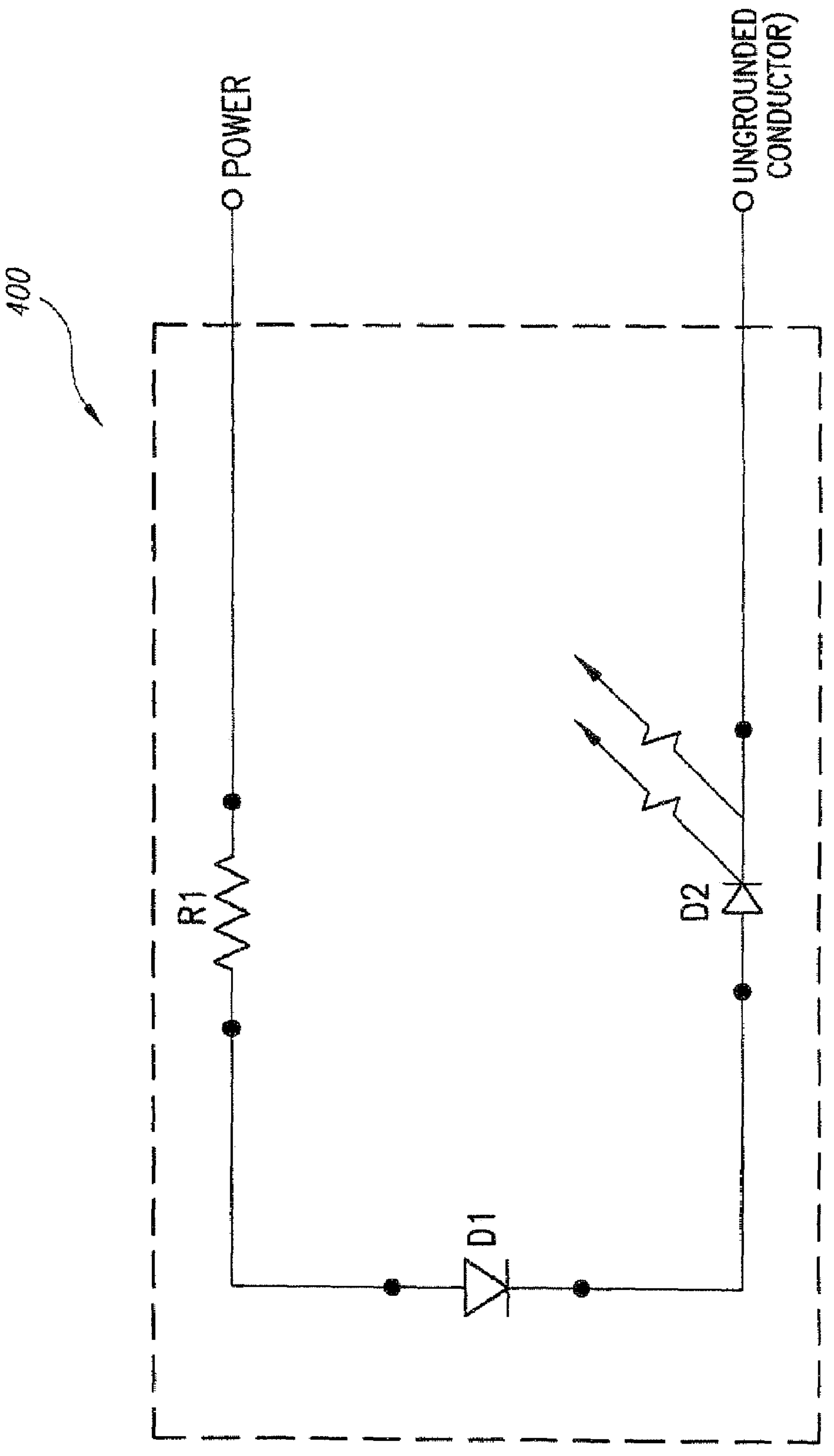
FIG. 7 is an electrical schematic of an LED circuit for a double pole LED outlet switch according to the present invention.

An electrical schematic of an LED circuit 400, as shown in FIG. 7, is configured for use in the double pole LED outlet switches described herein. The LED circuit 400 includes a resistor R1, a diode D1, and an LED D2. The LED circuit 400 may be encased within a double pole LED outlet switch receptacle with the LED protruding, and inset between the power and the grounded conductor blade insertion points on the lower outlet of the double pole LED outlet switch. Two of the LED circuits 400, as shown in FIG. 7, with different color LEDs may be encased in the power receptacles of a dual double pole LED outlet switch described herein.

Figure 8:
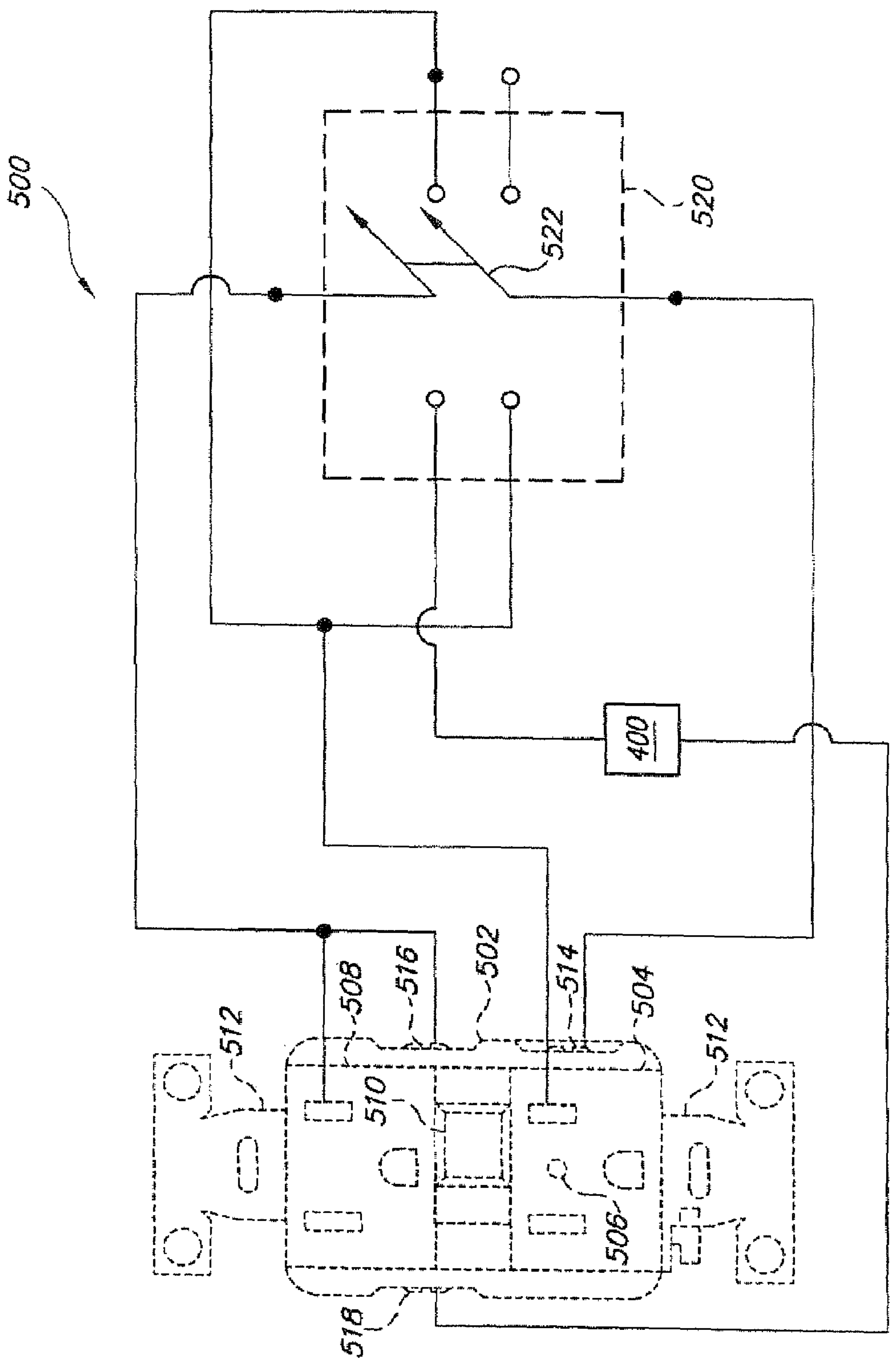
FIG. 8 is an electrical schematic of a double pole LED outlet switch circuit according to the present invention.

An electrical schematic of a double pole LED outlet circuit 500 is shown in FIG. 8. The outlet circuit 500 is configured for use in a double pole LED outlet switch 502. The outlet switch 502 includes a lower receptacle 504 with an aperture 506 for an LED from the LED circuit 400. The outlet switch 502 also includes an upper receptacle 508 and a DPDT switch 510. The circuit 520 for the DPDT switch 510 is mounted within the outlet switch 502. The DPDT switch 510 has two positions for either normal operation or wall SWITCHED operation of the lower receptacle 504. The LED circuit 400 is mounted inside the outlet switch 502, and is configured for indicating the position of the DPDT switch 510. When the DPDT switch 510 is set in the SWITCHED position, wall switch controlled operation of the lower receptacle 510 is indicated by the LED from the LED circuit 400 situated between the power and common blade within the lower receptacle 504. The outlet switch 502 is mounted on an outlet switch panel 512.

There are two lugs 514 and 516 on the right side of the outlet switch 502, and one lug 518 on the left side of the outlet switch 502. The lower lug 514 is configured as the SWITCHED lug when interconnected with continuous power from a remote switch. The upper lug 516 is configured as the UNSWITCHED lug when interconnected with a continuous power supply. The circuit 520 is mounted inside the outlet switch 502 and between the lower aid upper outlet receptacles 504 and 508. The outlet switch 502 is mounted on a panel 512.

The circuit 520 for the DPDT switch 510 has two operational positions and may function with all GFI and Arc Fault breakers. One position is the UNSWITCHED position. The other position is the SWITCHED position. The circuit 520 has six poles connected via wires to various parts of the outlet switch 502 and the LED circuit 400. The first pole is connected to a sixth pole and to the power blade of the lower outlet receptacle 504. The second pole is connected to the power lug that provides power controlled by a remote wall switch. The third pole is not used. The fourth pole is connected to the LED circuit 400 that indicates when the circuit 520 is in the SWITCHED position and the lower receptacle 504 is SWITCHED. The fifth pole is connected to the upper outlet receptacle 508 and the upper power lug 516 that provides continuous power to the upper receptacle 508 when interconnected with a continuous power supply. The sixth pole is connected to the first pole and to the power blade of the lower outlet receptacle 504.

When the DPDT switch 510 of the double pole outlet switch 502 is in the UNSWITCHED position, the outlet switch 502 functions as a normal duplex receptacle that supplies continuous uninterrupted power from both the lower and upper receptacle outlets 504 and 508. When the DPDT switch 510 is in the SWITCHED position, power is supplied to the upper receptacle outlet 508 through the upper and/or lower power lugs. Continuous power from the upper power lug is connected to the fifth pole of the circuit 520 and the power blade of the upper receptacle outlet 508. The continuous power is also routed to the power blade of the lower receptacle outlet 504 by the sixth pole of the circuit 520. Power from a remote wall switch is supplied to the second pole of the circuit 520. The SWITCHED power from a remote wall switch terminates at the third pole of the circuit 520. The first and fourth poles of the circuit 520 are not utilized and/or are electrically relevant when the DPDT switch 510 of the outlet switch 502 is positioned in the UNSWITCHED position.

When the DPDT switch 510 of the double pole outlet switch 502 is in the SWITCHED position, the lower receptacle outlet 504 is controlled by an interconnected remote wall switch. Power From the remote wall switch is supplied to the receptacle outlet 504 through the lower power lug 514 and/or the upper power lug 516. Continuous power from the upper power lug 516 is connected to the fifth pole of the circuit 520 and the power blade of the upper receptacle outlet 508. Continuous power from the remote wall switch is also routed to the LED circuit via the fourth pole of the circuit 520. The LED of the LED circuit 400 lights continuously when the DPDT switch 510 of the outlet switch 502 is in the SWITCHED position.

The power from the remote wall switch supplied to the lower lug 514 is connected to the second pole of the DPDT switch 520. The SWITCHED power is routed to the lower power blade via the first pole of the circuit 520. The third and sixth poles of the circuit 520 are not utilized or electrically relevant when the DPDT switch 510 is in the SWITCHED position. The LED circuit 400 is an optional component in the construction of the double pole LED outlet switch. The actuator of the DPDT switch 510 could be used to designate the switch position. However, the LED circuit 400 provides a much more effective visual indicator.

Figure 9:
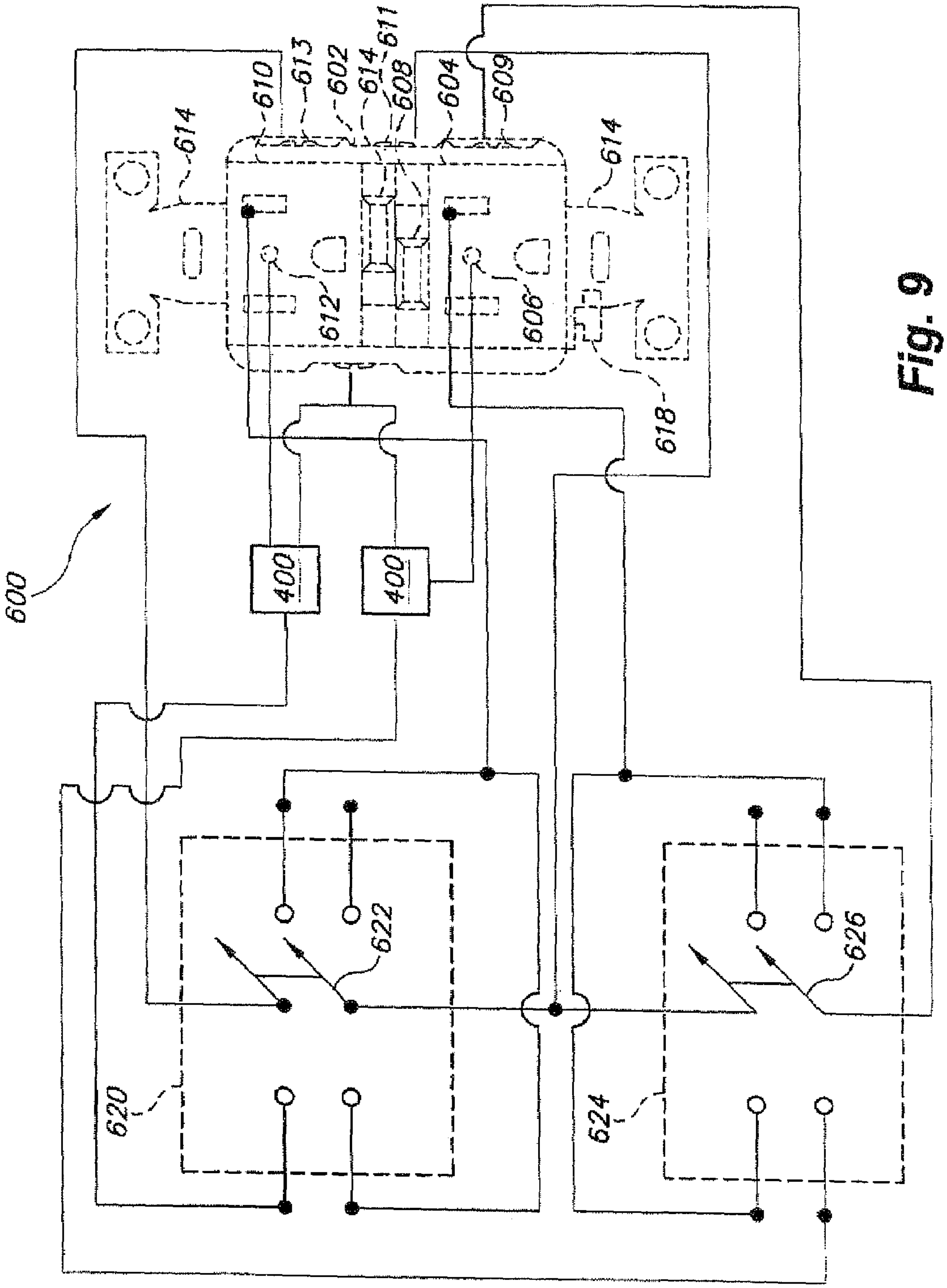
FIG. 9 is an electrical schematic of a dual double pole LED outlet switch circuit according to the present invention.

An electrical schematic of a dual double pole LED outlet circuit 600 is shown in FIG. 9. The outlet circuit 600 is configured for use in a dual double pole LED outlet switch 602. The outlet switch 602 includes a lower receptacle 604 with an aperture 606 for an LED from an associated LED circuit 400. A lower circuit 624 is mounted within the outlet switch 602. A DPDT switch 608 is associated with the lower circuit 624. The outlet switch 602 also includes an upper receptacle 610 with an aperture 612 for an LED from an associated LED circuit 400. An upper circuit 620 is mounted within the outlet switch 602. A DPDT switch 614 is associated with the upper circuit 620. The two DPDT switches 608 and 614 allow the outlet switch 602 to function as two separate (top and bottom) wall SWITCHED power outlets, while still allowing a standard UNSWITCHED option for either or both outlets 604 and 610. LEDs from the LED circuits 400 associated with the LED apertures 606 and 612 may be configured to illuminate different colors, such as red, blue, green, yellow, etc, in order to increase user flexibility to its greatest extent while minimizing confusion.

There are three power lugs 609, 611, and 613 on the right side of the outlet switch 602 that require three power sources. The power lug 609 is the SWITCHED lug for power from a first remote switch. The power lug 611 is the UNSWITCHED lug for the continuous power supply. The power lug 613 is the SWITCHED lug for power from a second remote switch. Each of the circuits 620 and 624 has a UNSWITCHED and a SWITCHED position and may function with all GFI and Arc Fault breakers. Each circuit 620 and 624 has six poles that are connected via wires to various parts of the outlet switch 602 and the LED circuits 400.

The first pole of the upper circuit 620 is connected to the sixth pole and power blade of the upper receptacle outlet 610. The second pole of the upper circuit 620 is connected to the power lug 613 that supplies power controlled by tie first remote wall switch. The third pole of the upper circuit 620 is not used. The fourth pole of the upper circuit 620 is connected to the upper LED circuit 400 and indicates when the upper circuit 620 is in the SWITCHED position. The fifth pole of the upper circuit 620 is connected to the fifth pole of the lower circuit 624 and the power lug 611 that provides continuous power to the outlet switch 602. The sixth pole of the upper circuit 620 is connected to the first pole of the upper circuit 620, and to the power blade of the upper receptacle outlet 610.

The first pole of the lower circuit 624 is connected to the sixth pole of the lower circuit 624, and to the power blade of the lower receptacle outlet 604. The second pole of the lower circuit 624 is connected to the power lug 609 that supplies power controlled by the second remote wall switch. The third pole of the lower circuit 624 is not used. The fourth pole of the lower circuit 624 is connected to the lower LED circuit 400 and indicates when the lower receptacle outlet is SWITCHED. The fifth pole of the lower circuit 624 is connected to the fifth pole of the upper circuit 620, and to the power lug 611 that provides continuous power to the outlet switch 602. The sixth pole of the lower circuit 624 is connected to the first pole of the lower circuit 624, and to the power blade of the lower receptacle outlet 604.

When the upper circuit 620 is in the UNSWITCHED position, the upper receptacle 610 functions as a normal outlet and supplies continuous uninterrupted power. While the upper circuit 620 is in the UNSWITCHED position, power is supplied to the upper receptacle 610 through power lug 611 and/or by either power lug 609 or power lug 613. The continuous power from the power lug 611 is connected to the fifth pole of the upper circuit 620 and the fifth pole of the lower circuit 624. The continuous power is then routed to the power blade of the upper receptacle 610 via the sixth pole of the upper circuit 620. The power from the first remote wall switch supplied to the power lug 615 is connected to the second pole of the upper circuit 620. The SWITCHED power from the first remote wall switch terminates at the third pole of the upper circuit 620. The first and fourth poles of the upper circuit 620, and the power lug 609 is not utilized and/or is electrically irrelevant when the upper circuit 620 is UNSWITCHED.

When the upper circuit 620 is SWITCHED, the upper receptacle 610 is controlled by the first remote wall switch. Power is supplied to the upper receptacle 610 through the power lug 611 and/or either the power lug 609 or the power lug 613. The continuous power from the power lug 611 is connected to the fifth pole of the upper circuit 620 and the fifth pole of the lower DPDT switch 624. The continuous power is routed to the upper LED circuit 400 via the fourth pole of the upper circuit 620. The LED of the upper LED circuit 400 is then lighted continuously when the upper circuit 620 is SWITCHED. The power from the first remote wall switch supplied to the power lug 613 is connected to the second pole of the upper circuit 620. The SWITCHED power is routed to the power blade of the upper receptacle 610 via the first pole of the upper circuit 620. The third and sixth poles of the upper circuit 620, and the power lug 609 are not utilized and/or are electrically irrelevant to the upper circuit 620 when the upper circuit 620 is SWITCHED.

When the lower circuit 624 is UNSWITCHED, the lower receptacle 604 functions as a normal outlet and supplies continuous uninterrupted power. While the circuit 624 is in the UNSWITCHED position, power is supplied to the lower receptacle 604 through power lug 611 and/or by either power lug 609 or power lug 613. The continuous power from the power lug 611 is connected to the fifth pole of the lower circuit 624 and the fifth pole of the upper circuit 620. The continuous power is then routed to the power blade of the lower receptacle outlet 604 by the sixth pole of the lower circuit 624. The power from the second remote wall switch supplied to the power lug 609 is connected to the second pole of the lower circuit 624. The SWITCHED power from the second remote wall switch terminates at the third pole of the lower circuit 624. The first and fourth poles of the lower circuit 624, and the power lug 613 is not utilized and/or is electrically irrelevant when the lower circuit 624 is UNSWITCHED.

When the lower circuit 624 is SWITCHED, the lower receptacle 604 is controlled by the second remote wall switch. Power is supplied to the lower receptacle 604 through the power lug 611 and/or either the power lug 609 or the power lug 613. The continuous power from the power lug 611, is connected to the fifth pole of the lower circuit 624 and the fifth pole of the upper circuit 620. The continuous power is routed to the lower LED circuit 400 via the fourth pole of the lower circuit 624. The LED of the lower LED circuit 400 is then lighted continuously when the lower circuit 624 is SWITCHED. The power from the second remote wall switch supplied to the power lug 609 is connected to the second pole of the lower circuit 624. The SWITCHED power is routed to the power blade of the lower receptacle 604 via the first pole of the lower circuit 624. The third and sixth poles of the lower circuit 624, and the power lug 613 are not utilized and/or are electrically irrelevant to the lower circuit 624 when the lower circuit 624 is SWITCHED. The LED circuits 400 are optional components in the construction of the double pole LED outlet switch. The actuators of the switches could be used to designate the switch position of the associated outlet switch, however the LED circuits 400 are a much more effective visual indicator.

Figure 10:
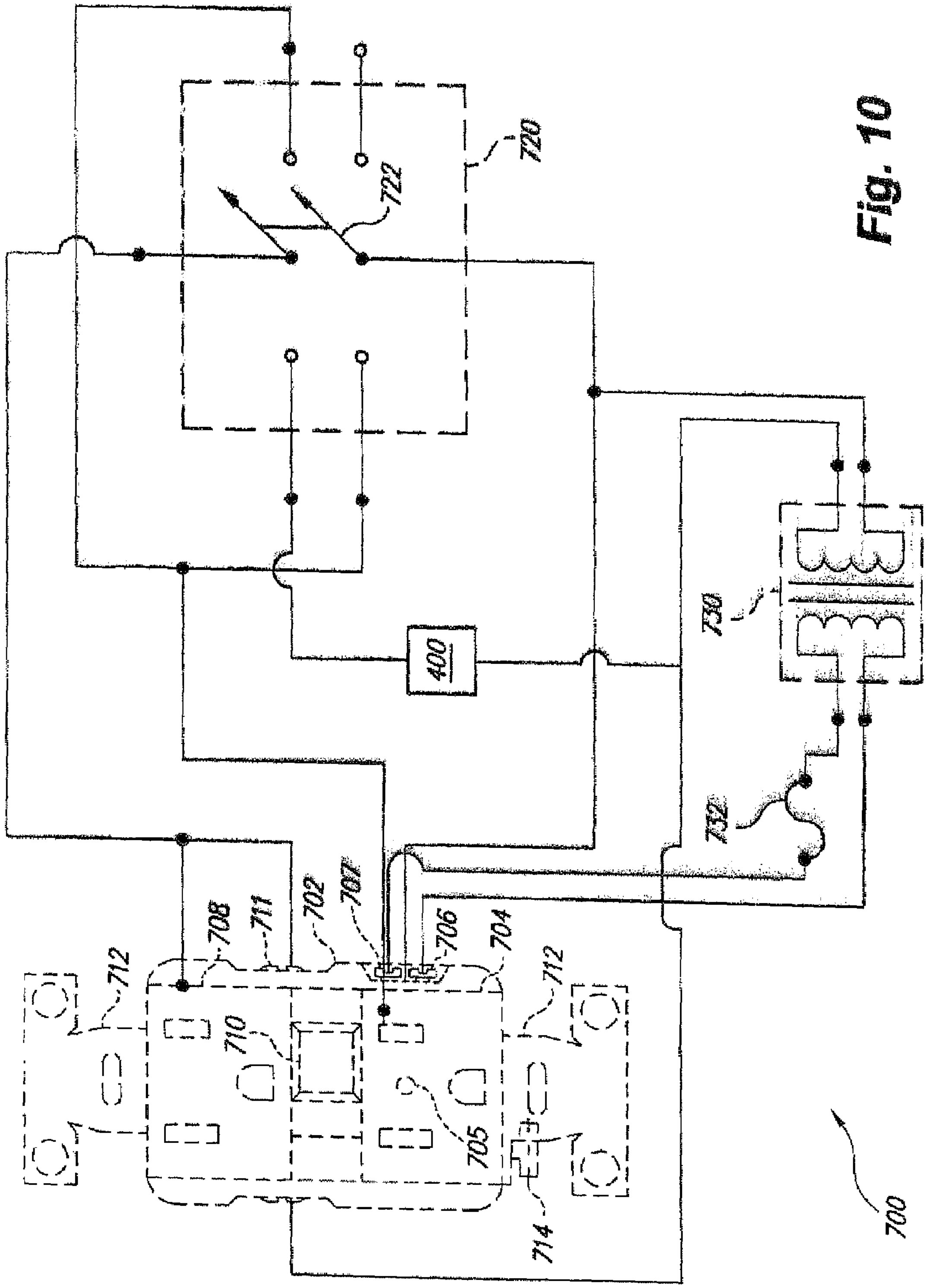
FIG. 10 is an electrical schematic of a double pole LED outlet switch circuit configured as a master unit according to the present invention.

Post construction double pole LED outlet switches may be configured as either a master unit or a slave unit. An electrical schematic of a double pole LED outlet switch circuit 700 configured as a master unit is shown in FIG. 10. The circuit 700 is configured for use in a dual double pole LED outlet switch 702. The outlet switch 702 includes a lower receptacle 704 with an aperture 705 for the LED from the LED circuit 400. The outlet switch 702 also includes an upper receptacle 708 and a DPDT switch 710. The outlet switch 702 also includes a pair of high voltage lugs and a pair of low voltage lugs, as well as a grounded conductor lug on the right side of the outlet switch 702.

The circuit 720 for the DPDT switch 710 is mounted within the outlet switch 702. The circuit 720 has two positions that allow for either normal operation or wall SWITCHED operation of the lower receptacle 704. An LED circuit 400 is mounted inside the outlet switch 702, and is configured for indicating the position of the DPDT switch 710. A step-down transformer 730 with a bridge rectifier (not shown) and a fuse 732 are also mounted in the outlet switch 702. The outlet switch 702 is mounted on an outlet switch panel 712.

The transformer 730 has four poles. The first pole of the transformer 730 is connected to the grounded conductor lug of the outlet switch 702. The second pole of the transformer 730 is connected to a second high voltage power lug of the outlet switch 702 and the second pole of the circuit 720. The third and fourth poles of the transformer 730 are connected to the low voltage lugs of the outlet switch 702. The first high voltage power lug of the outlet switch 702 is UNSWITCHED for the continuous power supply. The second high voltage power switch of the outlet switch 702 is the SWITCHED lug for power from a first remote wall switch. The pair of lower voltage lugs supply power to the slave units by activating the relay to the post construction LED outlet switch units.

The circuit 720 has two operational positions and may function with all GFI and Arc Fault breakers. One position is the UNSWITCHED position. The other position is the SWITCHED position. The circuit 720 has six poles which are connected via wires to various parts of the outlet switch 702 and the LED circuit 400. The first pole is connected to a sixth pole and to the power blade of the lower receptacle 704. The second pole is connected to the step-down transformer 730 and the power lug that provides power controlled by a remote wall switch . The third pole is not used. The fourth pole is connected to the LED circuit 400 that indicates when the circuit 720 is in the SWITCHED position and the lower receptacle 704 is SWITCHED. The fifth pole is connected to the power blade of the upper receptacle 708 and the power lug that provides continuous power to the outlet switch 702. The sixth pole is connected to the first pole and to the power blade of the lower receptacle 704.

When the circuit 720 is UNSWITCHED, the outlet switch 702 functions as a normal duplex receptacle supplying continuous uninterrupted power from both the lower and upper receptacles 704 and 708. The outlet switch 702 may supply low voltage power for operation of interconnected post production double pole LED slave units when power is provided to the one of the high power lugs and the corresponding lug is active. Power is supplied into the outlet switch 702 through one or both of the high voltage power lugs.

The continuous power from the first high voltage power lug is connected to the fifth pole of the DPDT switch 702 and the power blade of the upper receptacle 708. The continuous power is then routed to the power blade of the lower receptacle 704 via the sixth pole of the circuit 720. The power from the remote wall switch supplied to the second high voltage power slug is connected to the second pole of the circuit 720, and the step-down transformer 730. The SWITCHED power from the remote wall switch as it relates to the function of the lower receptacle 704 of the master unit, terminates at the third pole of the circuit 720.

Should the remote wall switch provide power to the second high voltage power lug and the second pole of the circuit 720 and the transformer 730, the transformer 730 energizes and provides low voltage power through the fuse 732 to the low voltage lugs on the right side of the outlet switch 702. The low voltage is conveyed between low voltage lugs of the outlet switch 702 and low voltage lugs of interconnected slave units (not shown) via low voltage wire. The first and fourth poles of the circuit 720 are not utilized and/or are not electrically relevant when the outlet switch 702 is UNSWITCHED.

When the circuit 720 is SWITCHED, the outlet switch 702 supplies SWITCHED power to the lower receptacle 704 and continuous power to the upper receptacle 708. Power is supplied to the outlet switch 702 through the both high voltage power lugs. The continuous power from the first high voltage power lug is connected to the fifth pole of the circuit 720 and the power blade of the upper receptacle 708. The continuous power is then routed to the LED circuit 400 via the fourth pole of the circuit 720. The LED of the LED circuit 400 is lighted continuously when the circuit 720 is SWITCHED.

The power from the remote wall switch supplied to the second power lug is connected to the second pole of circuit 720 and transformer 730, and the transformer energizes and provides low voltage power via fuse 732 to the low voltage lugs on the right side of the outlet switch 702. The low voltage power is conveyed between the low voltage lugs of the outlet switch 702 (master unit) and the low voltage lugs of any interconnected slave units (not shown) via low voltage wire. The third and sixth poles are not utilized and/or are electrically irrelevant to the circuit 720 when the circuit 720 is SWITCHED. The LED circuit 400 is an optional component in the construction of the post construction double pole LED outlet switch 702. The actuator of the switch could be used to designate switch position. However, the LED circuit 400 is a much more effective visual indicator.

Figure 11:
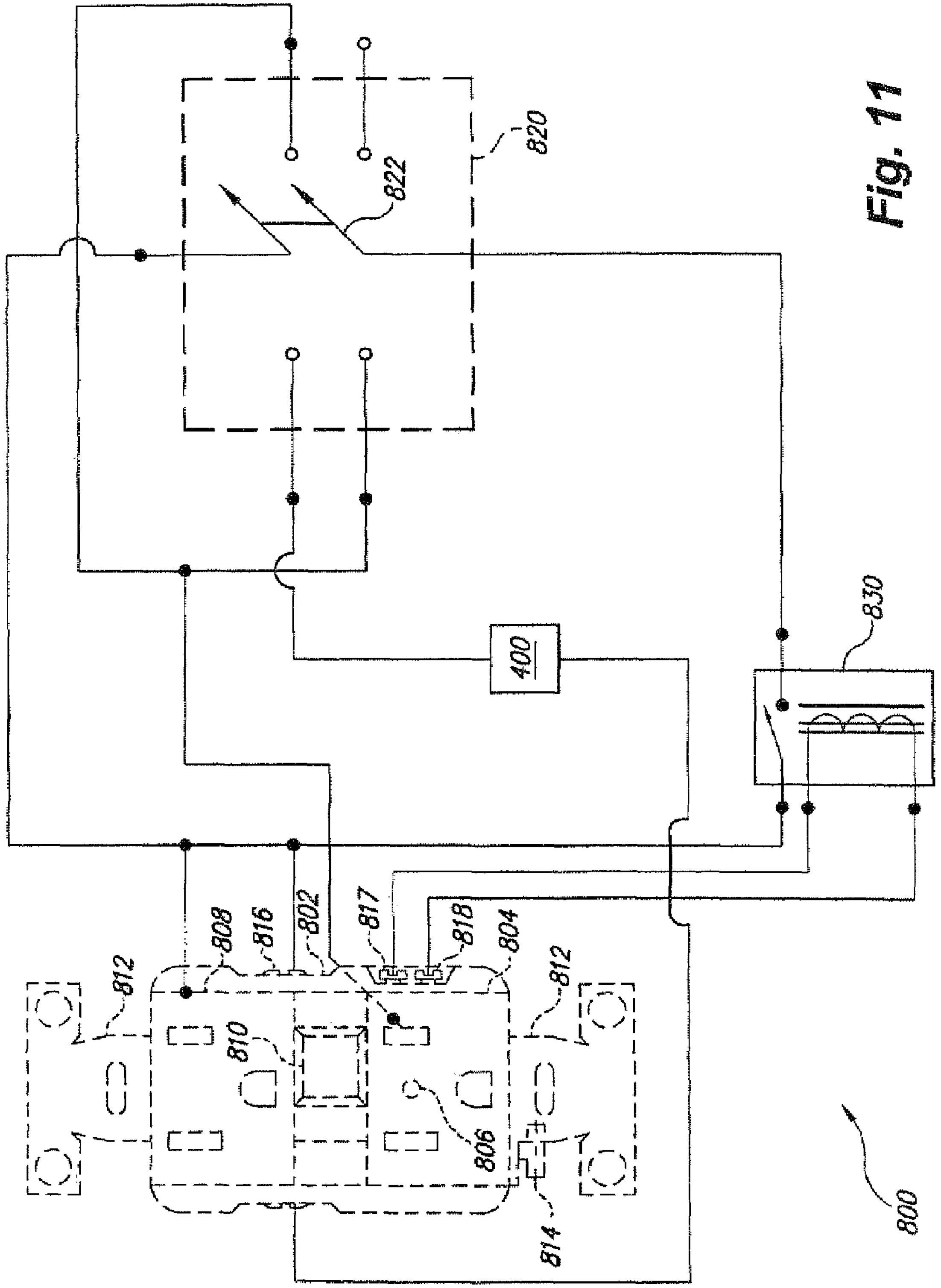
FIG. 11 is an electrical schematic of a double pole LED outlet switch circuit configured as a slave unit according to the present invention.
Figure 12D:
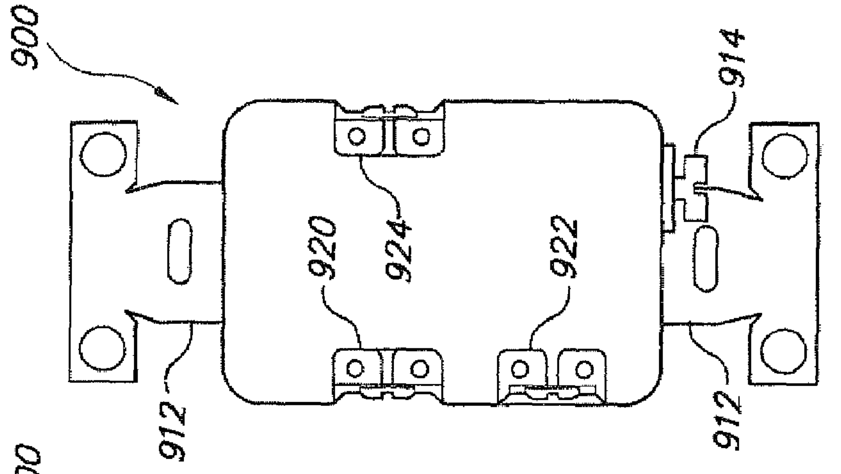
FIGS. 12A, 12B, 12C, and 12D are right side, front, left side, and rear views, respectively, of a double pole LED outlet switch according to the present invention.
Figure 12C:
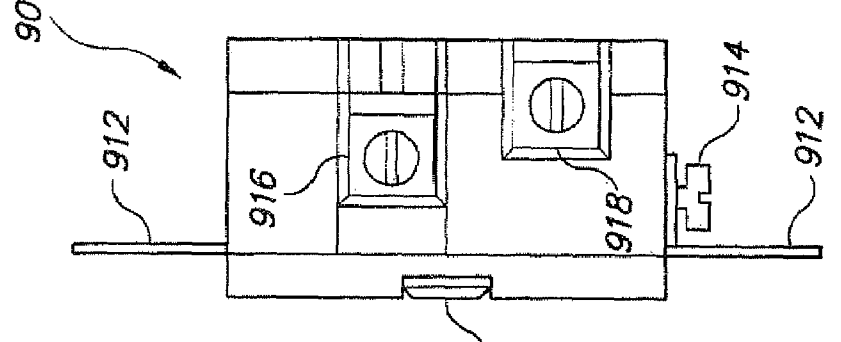
Figure 12B:
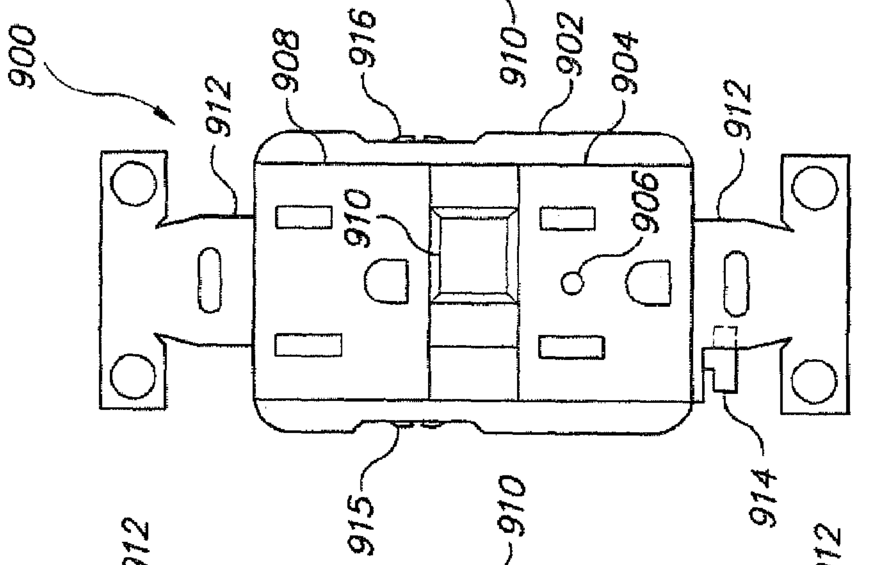
Figure 12A:
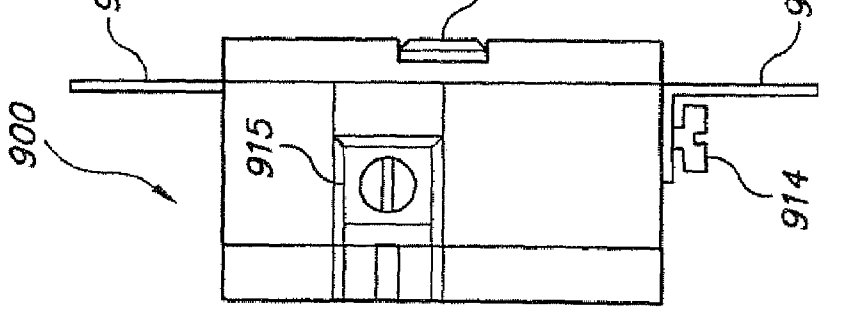
Figures 13A, 13B, 13C, 13D:
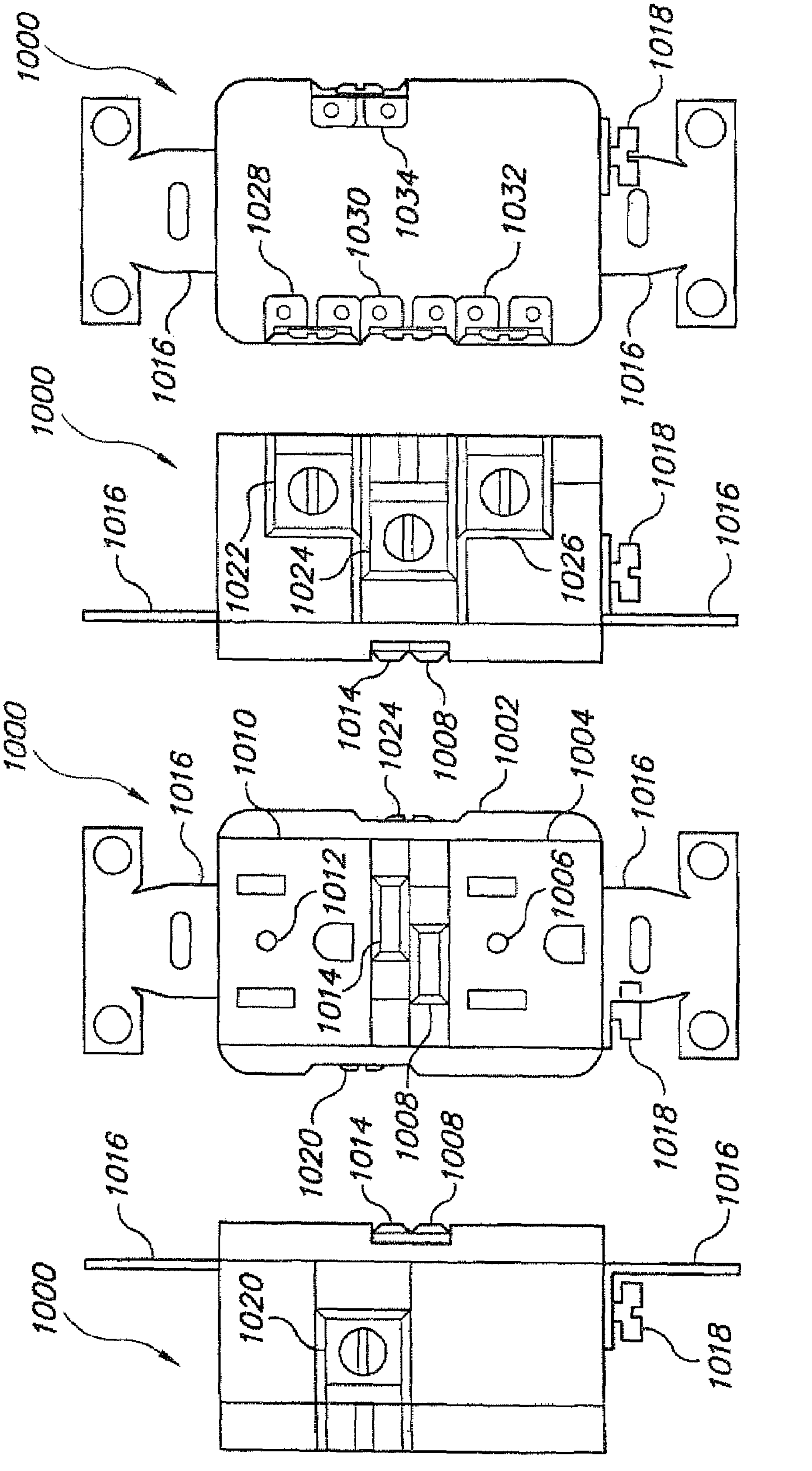
FIGS. 13A, 13B, 13C, and 13D are right side, front, left side, and rear views, respectively, of a dual double pole LED outlet switch according to the present invention.
Figures 14A, 14B, 14C, 14D:
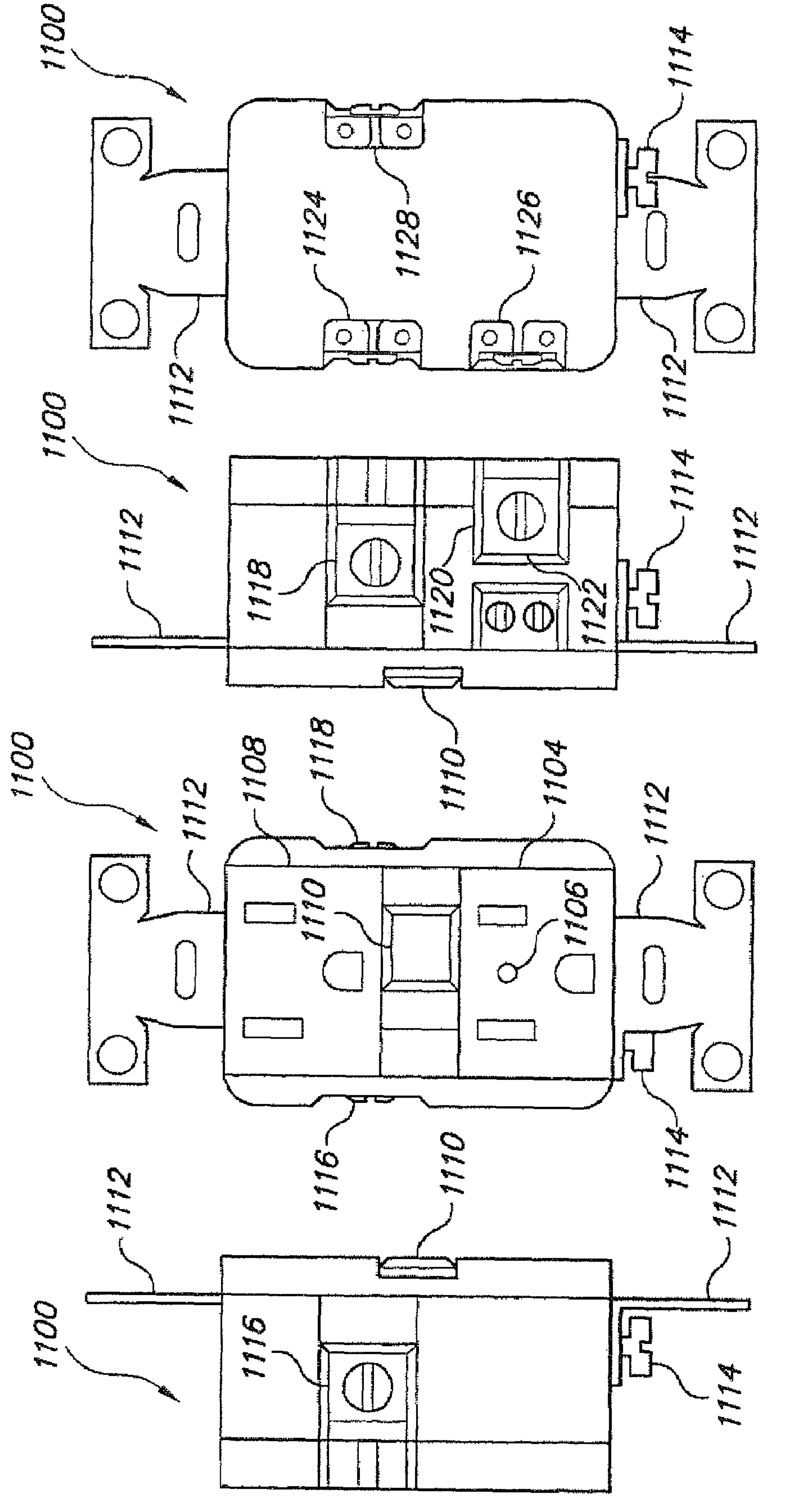
FIGS. 14A, 14B, 14C, and 14D are right side, front, left side, and rear views of a post construction double pole LED outlet switch configured as a master unit according to the present invention.
Figure 15D:
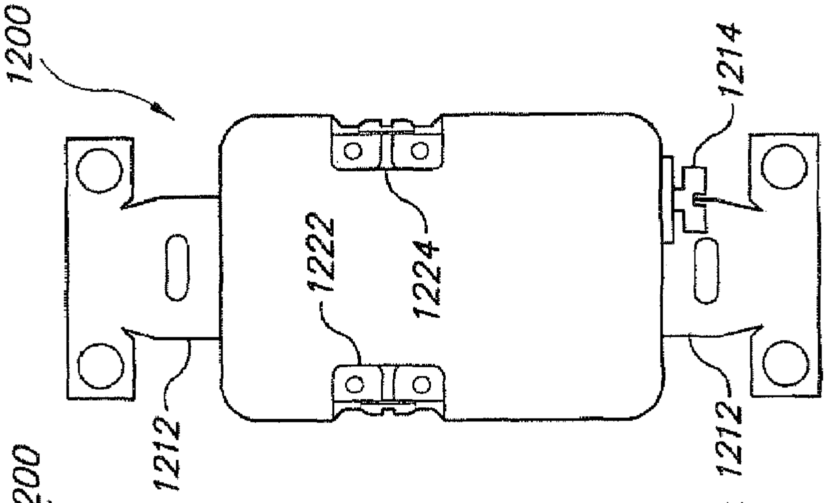
FIGS. 15A, 15B, 15C, and 15D are right side, front, left side, and rear views, respectively, of a post construction double pole LED outlet switch configured as a slave unit according to the present invention.
Figure 15C:
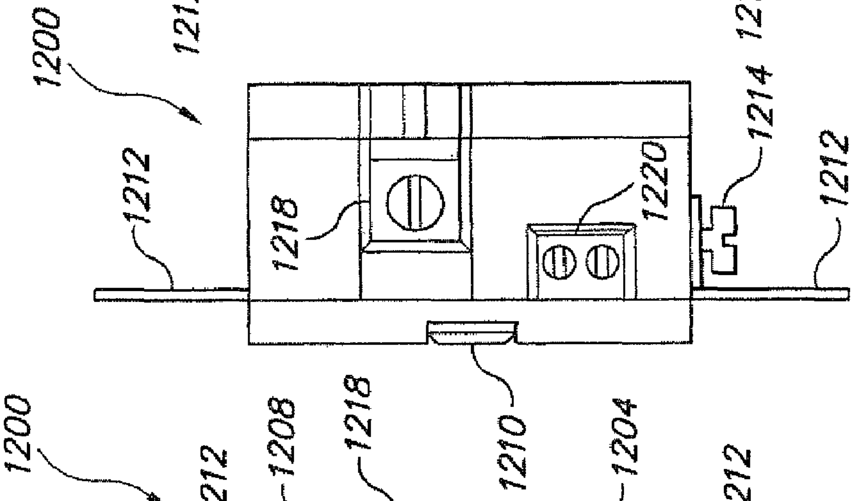
Figure 15B:
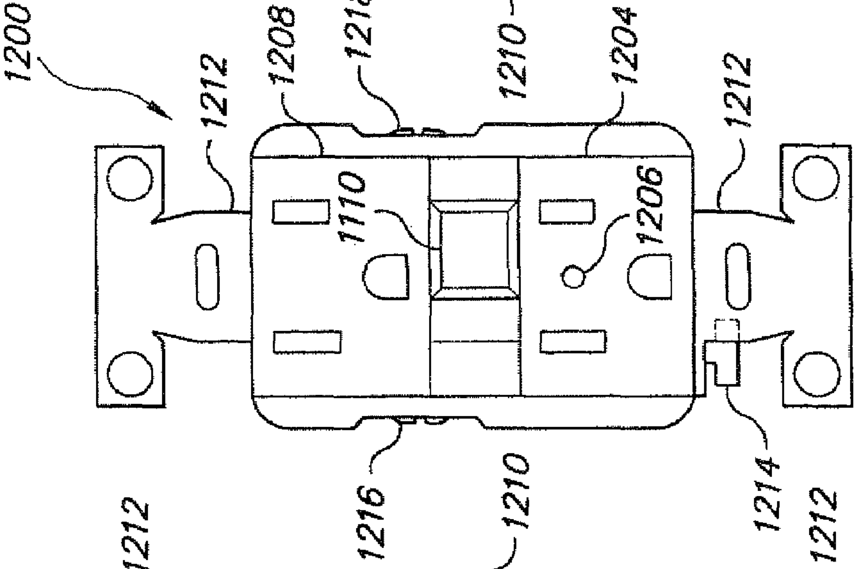
Figure 15A:
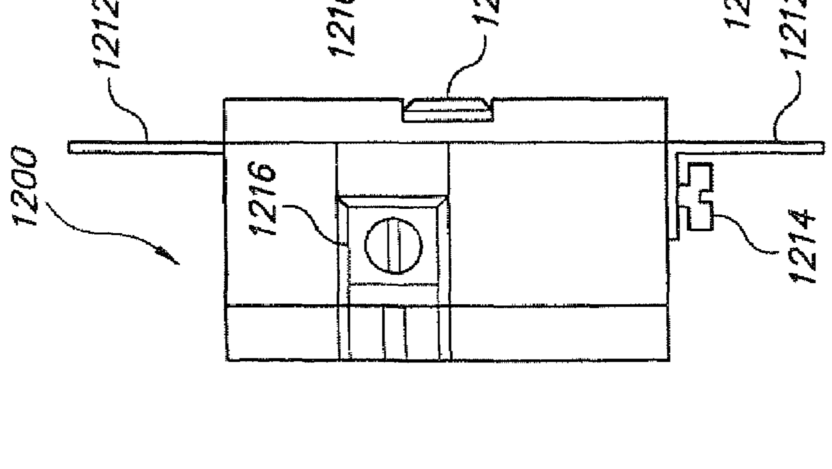

An electrical schematic of a double pole LED outlet switch circuit 800 configured as a slave unit is shown in FIG. 11. The circuit 800 is configured for use in a dual double pole LED outlet switch 802. The outlet switch 802 includes a lower receptacle 804 with an aperture 806 for the LED from the LED circuit 400. The outlet switch 802 also includes an upper receptacle 808 and a DPDT switch 810. The outlet switch 802 also includes a pair of high voltage lugs and a pair of low voltage lugs, as well as a grounded conductor lug on the right side of the outlet switch 802.

The circuit 820 for the DPDT switch 810 is mounted within the outlet switch 802. The DPDT switch 810 has two positions that allow for either normal operation or wall SWITCHED operation of the lower receptacle 804. An LED circuit 400 is mounted inside the outlet switch 802, and is configured for indicating the position of the DPDT switch 810. A relay 830 is also mounted in the outlet switch 802. The outlet switch 802 includes a single high voltage power lug 816, and a pair of smaller, low voltage power lugs 817 and 818 on the right side of the outlet switch 802.

The relay 830 has four poles. The first pole of the relay 830 is connected to the second pole of the circuit 820. The second pole of the relay 830 is connected to the high voltage power lug 816 of the outlet switch 802, the power blade of the upper receptacle 808, and the fifth pole of the circuit 820. The high voltage power lug 816 interconnects with a power supply and provides continuous power from the power supply to the outlet switch 802. The low voltage lugs 817 and 818 receive low voltage from an interconnected master unit.

The circuit 820 has two operational positions and may function with all GFI and Arc Fault breakers. One position is the UNSWITCHED position. The other position is the SWITCHED position. The circuit 820 has six poles that are connected via wires to various parts of the outlet switch 802 and the LED circuit 400, and the relay 830. The first pole is connected to a sixth pole and to the power blade of the lower outlet receptacle 804. The second pole is connected to the first pole of the relay 830. The third pole is not used. The fourth pole is connected to the LED circuit 400 that indicates when the circuit 820 is in the SWITCHED position. The fifth pole is connected to the second pole of the relay 830, the high voltage power lug of the outlet switch 802, and the power blade of the upper receptacle 808. The sixth pole is connected to the first pole and to the power blade of the lower receptacle 804.

When the circuit 820 is SWITCHED, the outlet switch 802 functions as a normal duplex receptacle supplying continuous uninterrupted power from both the lower and upper receptacles 804 and 808. Power is supplied into the outlet switch 802, when the outlet switch 802 is SWITCHED, through the high voltage power lug and through the low voltage power lugs. High voltage power received from the high voltage power lug connects to the fifth pole of the circuit 820, the power blade of the upper receptacle 808, and the second pole of the relay 830. High voltage power is then routed to the power blade of the lower receptacle 804 via the sixth pole of the circuit 820. High voltage power provided to the second pole of the relay 830 terminates if the relay 830 is not energized. Should low voltage power supplied from an interconnected master unit and provided by the low voltage lugs of the outlet switch 802 energize the relay 830, the high voltage is then routed to the circuit 820 via the first pole of the relay 830 and the second pole of the DPDT switch 810. The high voltage then terminates at the third pole of the circuit 820. The first and fourth poles of the circuit 820 are not utilized and/or are electrically irrelevant when the outlet switch 802 is UNSWITCHED.

When the circuit 820 is SWITCHED, the lower receptacle 804 is controlled by the remote wall switch via the low voltage power conveyed from the master unit. Power is supplied to the outlet switch, when the DPDT switch is SWITCHED, through the high voltage power lug and through the low voltage power lugs. High voltage power received from the high voltage power lug is provided to the fifth pole of the circuit 820, the power blade of the upper receptacle 80S, and the second pole of the relay 830. The high voltage power is then routed to the LED circuit 400 via the fourth pole of the circuit 820. The LED is lighted continuously when the circuit 820 is SWITCHED. High voltage power received by the second pole of the relay 830 terminates at the relay 830 if the relay is not energized.

Should low voltage power supplied from an interconnected master unit and provided by the low voltage lugs of the outlet switch 802 energize the relay 830, the high voltage is then routed to the circuit 820 via the first pole of the relay 830 and the second pole of the circuit 820. The high voltage is then routed to the lower power blade of the lower receptacle 804 via the first pole of the circuit 820. The third and sixth poles of the circuit 820 are not utilized and/or are electrically irrelevant to the circuit 820 when the circuit 820 is SWITCHED. The LED circuit 400 is an optional component in the constriction of the post construction double pole LED outlet switch 802. The actuator of the circuit 820 could be used to designate switch position. However, the LED circuit 400 is a much more effective visual indicator.

FIGS. 12A-12D illustrate respective left side, front, right side, and rear views of a double pole LED outlet switch 900. The outlet switch 902 includes a lower receptacle 904 and an LED 906. The outlet switch 902 also includes an upper receptacle 908 and a DPDT switch 910. The DPDT switch 910 has two positions for either normal operation or wall SWITCHED operation of the lower receptacle 904. When the DPDT switch 910 is set in the SWITCHED position, wall switch controlled operation of the lower receptacle 904 is indicated by the LED 906. The outlet switch 902 is mounted on an outlet switch panel 912.

There are two lugs 916 and 918 on the right side of the outlet switch 902, and one lug 915 on the left side of the outlet switch 902. The upper lug 916 is configured as the UNSWITCHED lug when interconnected with a continuous power supply. The lower lug 918 is configured as the SWITCHED lug when interconnected with continuous power from a remote switch.

FIGS. 13A-13D illustrate respective left side, front, right side, and rear views of a dual double pole LED outlet switch 1000. The outlet switch 1002 includes a lower receptacle 1004 with an LED 1006 and a DPDT switch 1008. The outlet switch 1002 also includes an upper receptacle 1010 with an LED 1012 and a DPDT switch 1014. The two DPDT switches 1008 and 1014 allow the outlet switch 1002 to function as two separate (top and bottom) wall SWITCHED power outlets, while still allowing a standard UNSWITCHED option for either or both outlets 1004 and 1010. The LEDs 1006 and 1012 may be configured to illuminate different colors, such as red, blue, green, yellow, etc., in order to increase user flexibility to its greatest extent while minimizing confusion.

There are three power lugs 1022, 1024, and 1026 on the right side of the outlet switch 1002 that require three power sources. The power lug 1022 is the SWITCHED lug for power from a first remote switch. The power lug 1024 is the UNSWITCHED lug for the continuous power supply. The power lug 1026 is the SWITCHED lug for power from a second remote switch.

FIGS. 14A-14D illustrate respective left side, front, right side, and rear views of a post construction dual double pole LED outlet switch 1100 configured as a master unit. The outlet switch 1100 includes a lower receptacle 1104 with an LED 1106. The outlet switch 1100 also includes an upper receptacle 1108, a DPDT switch 1110, a pair of high voltage lugs, and a pair of low voltage lugs, as well as a grounded conductor lug on the right side of the outlet switch 1100.

FIGS. 15A-15D illustrate respective left sides front, right side, and rear views of a post construction dual double pole LED outlet switch 1200 configured as a slave unit. The outlet switch 1200 includes a lower receptacle 1204 with an LED 1206. The outlet switch 1200 also includes an upper receptacle 1208, a DPDT switch 1210, a pair of high voltage lugs, and a pair of low voltage lugs, as well as a grounded conductor lug on the right side of the outlet switch 1200.

The inventive double pole LED outlet switch is designed for simplistic function. After this device is installed in place of standard outlets in a given room it is quite simple to select which outlets will be remotely SWITCHED and which ones will maintain continuous power. One simply needs to slide the associated DPDT switch between the upper and lower receptacles of the outlet switch to the position that illuminates the LED between the blades of the lower outlet. The appearance of light indicates a remote controlled position. No appearance of light indicates that power will not be interrupted by the remote switch. In the dual double pole LED outlet switch the upper switch lights the upper LED to indicate its function independent of the lower switch and the lower LED.

While the invention has been described with references to its preferred embodiments, it will be understood by those skilled in the art that various changes may be made and equivalents may be substituted for elements thereof without departing from the true spirit and scope of the invention. In addition, many modifications maybe made to adapt a particular situation or material to the teaching of the invention without departing from its essential teachings.

I claim:

1. A double pole light emitting diode (LED) outlet switch comprising:

a power outlet receptacle including a first receptacle outlet and a second receptacle outlet;

a double pole double throw (DPDT) switch positionable between an unswitched position and a switched position;

wherein the DPDT switch is configured to enable a user to selectively provide either continuous power or switched power to at least one of the first and the second receptacle outlets of the double pole LED outlet switch, thereby to enhance flexibility in selectively connecting an electrically powered device such as a lamp to one of the receptacle outlets.

2. The double pole LED outlet switch according to claim 1, further comprising LED circuitry including at least one LED to provide a visual indication as to whether said at least one of the first or second receptacle outlets in the double pole LED outlet switch is configured to provide switched power.

3. The double pole LED outlet switch according to claim 2, further comprising plural LEDs to provide visual indications in multiple colors.

4. The dual double pole LED outlet switch according to claim 1, further comprising at least one lug configured to interconnect the double pole LED outlet switch with a power source.

5. The double pole LED outlet switch according to claim 4, wherein said at least one lug comprises a pair of high voltage power lugs and a pair of low voltage power lugs.

6. The double pole LED outlet switch according to claim 1, wherein the double pole LED outlet switch is configured as a master unit.

7. The double pole LED outlet switch according to claim 1, wherein the double pole LED outlet switch is configured as a slave unit.

8. The double pole LED outlet switch according to claim 1, in combination with at least one remote wall switch, wherein the at least one remote wall switch is electrically interconnected with a power source, and is electrically interconnected with the double pole LED outlet switch.

9. The double pole LED outlet switch according to claim 1, in combination with at least one remote wall switch and at least one additional double pole LED outlet switch, wherein said at least one remote wall switch and said at least one additional double pole LED outlet switch are each electrically interconnected with a power source, and are electrically interconnected with the double pole LED outlet switch.

10. The double pole LED outlet switch according to claim 9, wherein said at least one remote wall switch comprises at least two remote wall switches.

11. A dual double pole light emitting diode (LED) outlet switch comprising:

a power outlet receptacle including a first receptacle outlet and a second receptacle outlet;

a first DPDT switch associated with the first receptacle outlet, the first DPDT switch being positionable between an unswitched position and a switched position, and being configured to enable a user to provide either continuous power or switched power to the first receptacle outlet double LED outlet switch; and a second DPDT switch associated with the second receptacle outlet, the second DPDT switch being positionable between an unswitched position and a switched position, and being configured to enable a user to provide either continuous power or switched power to the second receptacle outlet double pole LED outlet switch;

thereby to enhance flexibility in selectively connecting an electrically powered device such as a lamp to either of the first and second receptacle outlets.

12. The dual double pole LED outlet switch according to claim 11, further comprising LED circuitry including a first LED to provide a visual indication as to whether the first receptacle outlet in the dual double pole LED outlet switch is configured to provide switched power, and a second LED to provide a visual indication as to whether the second receptacle outlet in the dual double pole LED outlet switch is configured to provide switched power.

13. The dual double pole LED outlet switch according to claim 12, wherein the first and second LEDs provide visual indications in multiple colors.

14. The dual double pole LED outlet switch according to claim 11, further comprising at least one lug configured to interconnect the dual double pole LED outlet switch with a power source.

15. The dual double pole LED outlet switch according to claim 11, wherein said at least one lug comprises a pair of high voltage power lugs and a pair of low voltage power lugs.

16. The dual double pole LED outlet switch according to claim 11, wherein the double pole LED outlet switch is configured as a master unit.

17. The dual double pole LED outlet switch according to claim 11, wherein the double pole LED outlet switch is configured as a slave unit.

18. The dual double pole LED outlet switch according to claim 11, in combination with at least one remote wall switch, wherein the remote wall switch is electrically interconnected with a power source, and is electrically interconnected with the double pole LED outlet switch.

19. The dual double pole LED outlet switch according to claim 11, in combination with at least one remote wall switch and at least one additional dual double pole LED outlet switch, wherein said at least one remote wall switch and said at least one additional dual double pole LED outlet switch are each electrically interconnected with a power sources and are electrically interconnected with the dual double pole LED outlet switch.

20. The dual double pole LED outlet switch according to claim 19, wherein said at least one remote wall switch comprises at least two remote wall switches.

21. In combination, the invention comprising:

a remote wall switch;

a power outlet receptacle including a first and second receptacle outlets, the power outlet receptacle operatively connected to the remote wall switch;

a double pole double throw (DPDT) switch selectively positionable between an unswitched position and a switched position, and operatively connected to at least one of the first and the second receptacle outlets, the DPDT switch being configured to enable a user to selectively provide either continuous power or switched power to said one of the first and second receptacle outlets, thereby to enhance flexibility in selectively connecting an electrically powered device to said at least one of the first and second receptacle outlets, so that the remote wall switch can be operated to turn off or on the electrically powered device.

22. The invention of claim 21 further comprising:

a visual indicator operatively connected to the DPDT switch, to indicate visually which of said at least one of the first and the second outlets is connected thereto.

23. The invention of claim 22 wherein said visual indicator includes at least one LED.

* * * * *

UNITED STATES PATENT AND TRADEMARK OFFICE

CERTIFICATE OF CORRECTION

PATENT NO. : 7,405,493 B2
APPLICATION NO. : 11/559279
DATED : July 29, 2008
INVENTOR(S) : Robert J. Leo It is certified that error appears in the above-identified patent and that said Letters Patent is hereby corrected as shown below:

In column 1, line 10, “1. Field of the Invention” should read --Field of the Invention--.

In column 1, line 15, “2. Description of the Related Art” should read --Description of the Related Art--.

In column 1, line 53, “The Waugh et at. application” should read --The Waugh et al. application--.

In column 2, line 14, “The Present patent does” should read --The Prasert patent--.

In column 3, line 26, “Peterson et at., describes” should read --Peterson et al., describes--.

In column 4, line 66, “invention, FIGS 15A, 15B, 15C, and 15D” should read
--invention.
FIGS 15A, 15B, 15C, and 15D--.

In column 7, line 57, “receptacle 318 with all” should read --receptacle 318 with an--.

In column 8, line 68, “between the lower aid upper” should read --between the lower and upper--.

In column 9, line 37, “Power From the remote” should read --Power from the remote--.

In column 10, line 18, “has a UNSWITCHED” should read --has an UNSWITCHED--.

In column 10, line 26, “controlled by tie first” should read --controlled by the first--.

In column 12, line 36, “switch. the third” should read --switch. The third--.

In column 14, line 39, “the upper receptacle 80S” should read --the upper receptable 808--.

UNITED STATES PATENT AND TRADEMARK OFFICE

CERTIFICATE OF CORRECTION

PATENT NO. : 7,405,493 B2
APPLICATION NO. : 11/559279
DATED : July 29, 2008
INVENTOR(S) : Robert J. Leo It is certified that error appears in the above-identified patent and that said Letters Patent is hereby corrected as shown below:

In column 14, line 55, “in the constriction of the post” should read --in the construction of the past--.

In column 18, line 6, “a power sources” should read --a power source,--.

Signed and Sealed this

Fourteenth Day of July, 2009

JOHN DOLL
*Acting Director of the United States Patent and Trademark Office*